(12) United States Patent
Plante et al.

(10) Patent No.: US 7,093,564 B1
(45) Date of Patent: Aug. 22, 2006

(54) BIRD CAGE

(75) Inventors: Robin Plante, Sainte-Barbe (CA); Marc LaFond, Laval (CA)

(73) Assignee: Rolf C. Hagen, Inc., Montreal (CA)

( * ) Notice: Subject to any disclaimer, the term of this patent is extended or adjusted under 35 U.S.C. 154(b) by 0 days.

(21) Appl. No.: 11/195,442

(22) Filed: Aug. 2, 2005

Related U.S. Application Data

(63) Continuation of application No. 10/793,157, filed on Mar. 4, 2004, now Pat. No. 6,923,143, which is a continuation of application No. 10/140,722, filed on May 7, 2002, now Pat. No. 6,715,445.

(51) Int. Cl.
*A01K 1/03* (2006.01)

(52) U.S. Cl. ........................ 119/461; 119/469

(58) Field of Classification Search .............. 119/461, 119/498, 474, 459, 452, 453, 463, 454, 462, 119/464, 475, 478, 469, 470, 472, 482, 473, 119/479; 312/122, 126, 127, 333, 334.6, 312/334.27
See application file for complete search history.

(56) References Cited

U.S. PATENT DOCUMENTS

| | | | |
|---|---|---|---|
| 747,494 A | 12/1903 | Smith | |
| 889,191 A | 6/1908 | Bell | |
| 922,020 A | 5/1909 | Mulzer | |
| 1,651,982 A | 12/1927 | Zimmerman | |
| 1,656,282 A | 1/1928 | Leon | |
| 1,771,492 A | 7/1930 | Karlson | |
| 1,821,348 A | 9/1931 | Lewicki | |
| 2,659,345 A | 11/1953 | Herbert | |
| 2,769,426 A | 11/1956 | Bromley | |
| 2,914,022 A | 11/1959 | Hinton | |
| 3,100,474 A | 8/1963 | Gabriel | |
| 3,742,909 A * | 7/1973 | Yellin | 119/479 |
| 3,815,549 A * | 6/1974 | Opmeer | 119/459 |
| 4,319,545 A | 3/1982 | Sou | |
| 4,586,463 A | 5/1986 | Braeuner | |
| 4,617,873 A | 10/1986 | Kelmetis | |
| 4,696,257 A * | 9/1987 | Neary et al. | 119/166 |
| 5,000,121 A | 3/1991 | Daily | |
| 5,010,848 A | 4/1991 | Rankin | |
| 5,092,269 A * | 3/1992 | Phillips et al. | 119/452 |
| 5,152,247 A | 10/1992 | Brown | |
| 5,186,122 A * | 2/1993 | Phillips et al. | 119/474 |
| 5,201,278 A * | 4/1993 | Hehn | 119/469 |
| 5,377,619 A * | 1/1995 | Katz | 119/461 |
| 5,448,964 A | 9/1995 | Takimoto | |
| 5,452,681 A * | 9/1995 | Ho | 119/498 |

(Continued)

OTHER PUBLICATIONS

BirdTimes, Delta Pet, Inc. "Starbright" Oct. 1997.

(Continued)

*Primary Examiner*—Yvonne R. Abbott
(74) *Attorney, Agent, or Firm*—Wolf Greenfield & Sacks PC

(57) ABSTRACT

A bird cage having a frame including a base assembly, cover assembly and corner towers that join the base and cover assemblies. The front, back, sides and top of the cage are enclosed by wire grills. The towers are made of light pervious material such as clear or translucent plastic and carry feeding stations. The cage is expandable. The base assembly includes an easily removable tray for collecting droppings in the cage, and the tray carries a wire grill platform within the cage which may be removed by partially withdrawing the tray and without otherwise disturbing the base assembly.

A bird cage stand composed of two identical but inverse sub-assemblies provides storage space for feed and cage accessories.

6 Claims, 22 Drawing Sheets

U.S. PATENT DOCUMENTS

| | | | |
|---|---|---|---|
| 5,533,466 A | | 7/1996 | Kohus et al. |
| 5,694,884 A | * | 12/1997 | Eicoff .......................... 119/469 |
| 5,794,567 A | | 8/1998 | Itzhak |
| 5,803,018 A | | 9/1998 | Liou |
| 5,862,778 A | * | 1/1999 | Matsumoto ................. 119/472 |
| 5,957,086 A | * | 9/1999 | Gallardo ..................... 119/429 |
| 5,957,087 A | | 9/1999 | Bonder et al. |
| 5,988,110 A | * | 11/1999 | Peterson ..................... 119/453 |
| 5,996,536 A | * | 12/1999 | King .......................... 119/459 |
| 6,032,614 A | * | 3/2000 | Tominaga ................... 119/452 |
| 6,095,087 A | * | 8/2000 | Bloedorn ................... 119/52.2 |
| 6,129,052 A | | 10/2000 | Huang |
| 6,338,318 B1 | | 1/2002 | Apichom |
| 6,460,486 B1 | | 10/2002 | Powers et al. |
| 6,626,129 B1 | * | 9/2003 | Schrader ..................... 119/479 |
| 6,637,322 B1 | | 10/2003 | Veltrop |
| 6,832,580 B1 | * | 12/2004 | Marchioro ................. 119/452 |
| 2001/0054394 A1 | | 12/2001 | Marchioro |

OTHER PUBLICATIONS

American Pet Supplies catalog along with other miscellaneous catalogs and advertisements undated 14 pages.
Parrot Lovers Catalogue, undated.
Animal Environments, 1995.
Bird Talk Advertisements, 1998, 1999 and 2000, 25 pages.
Bird Talk's Guide to cages undated, 12 pages.
King's Cages, L.P. advertisements, 6 pages.
Neon Pet Products undated, 3 pages.
Animal Environments, 1997, 4 pages.
Bird Talk, Cage Avianix, Inc., advertisement, Dec. 1998, p. 74.
Bird Talk, Cage Avianix, Inc. advertisement, Jan. 2000, p. 63.
Bird Talk, The Feather Farm advertisement, May 1998, p. 79.
Bird Talk, The Feather Farm advertisement, Jul. 1998, p. 70.
Bird Talk, Bird Motel advertisement, Dec. 1993, p. 103.
Practica Schutzpavillon, flier.
Big Spring Tropical, flier.
Parrot Lovers Catalog, undated.
Bird Talk , Covering the Cage, "Fight That Bird Mess", May 1998, pp. 21-33.
Bird Talk , Covering the Cage, "Nuts & Bolts of Avian Hardware" Jul. 1998, pp. 50 & 52.
Bird Talk , Make Your Bird's House a Home, Aug. 1968, 19 pages.
Bird Talk , Covering the Cage, "A Fine Mesh", Oct. 1999, pp. 70-71.
"Catching an Escaped Bird", Adam Fitzgerald, Dec.-Jan. 1998, pp. 581-582.
Bird Keeper "Guarding Against Escapees", Oct. 1999.
"All to do with the Cage" undated, pp. 22-27.
"Choosing a Cage" undated 4 pages.
Birds, "Shop Front Large Cages", Aug. 1997, pp. 23-24.
Caged Bird Hobbyist, "Shop Front Small Cages", Apr. 1997, pp. 19-20.
Ferplast Cages, undated.

* cited by examiner

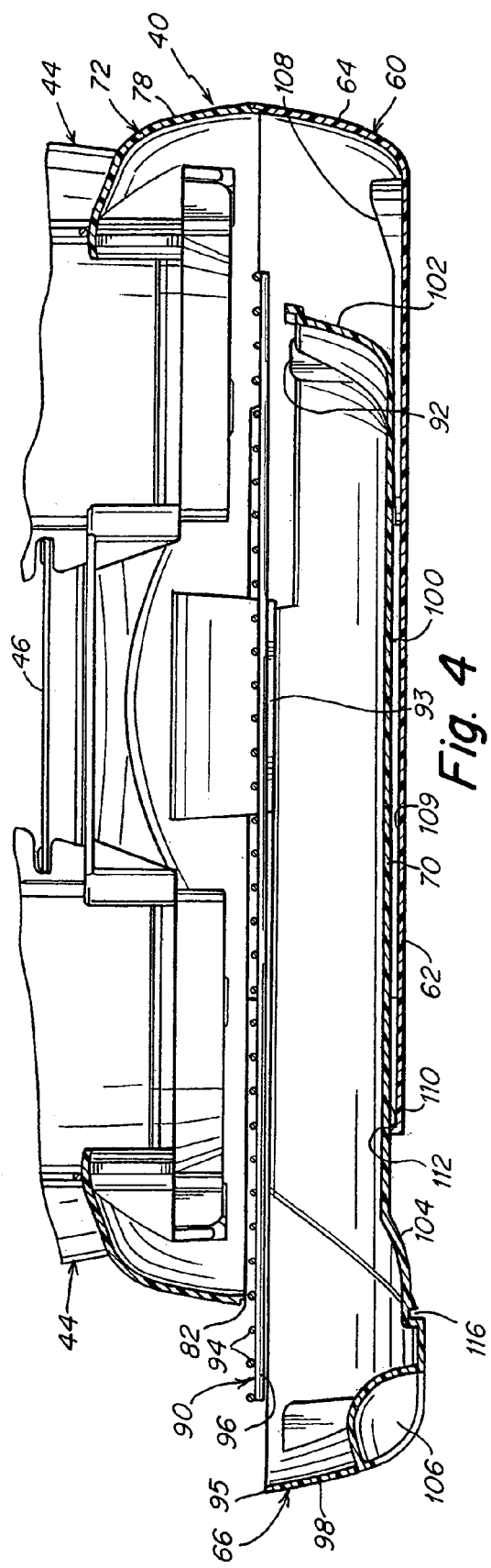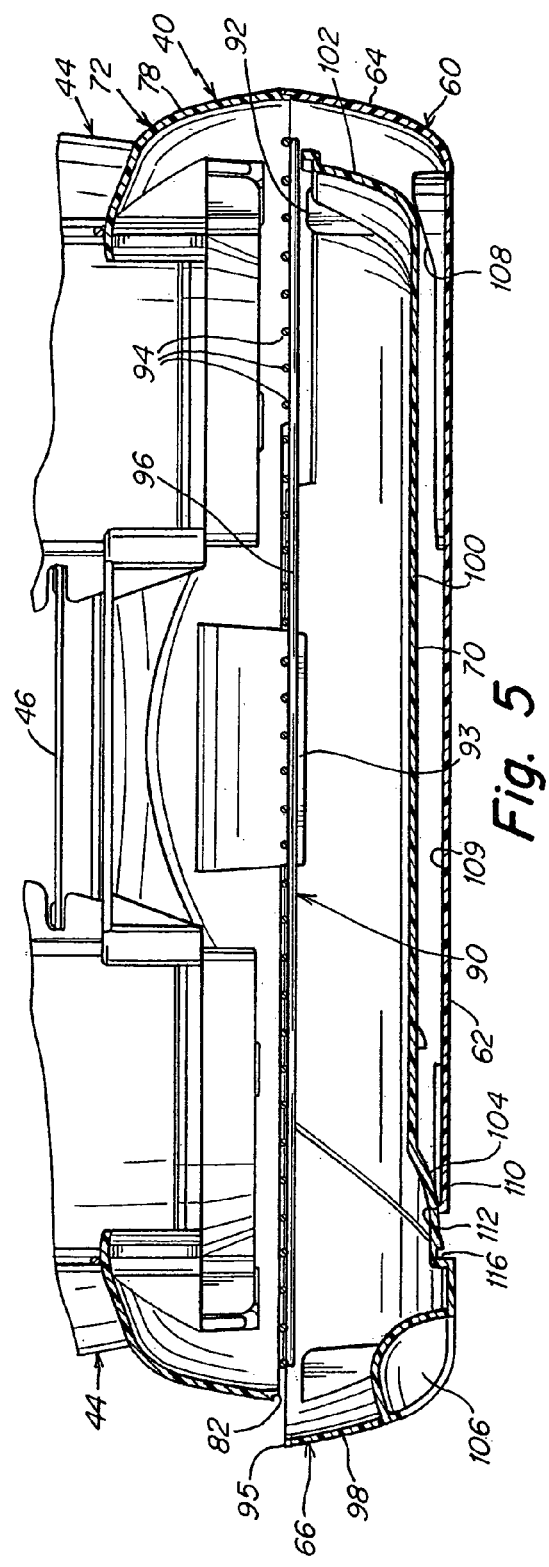

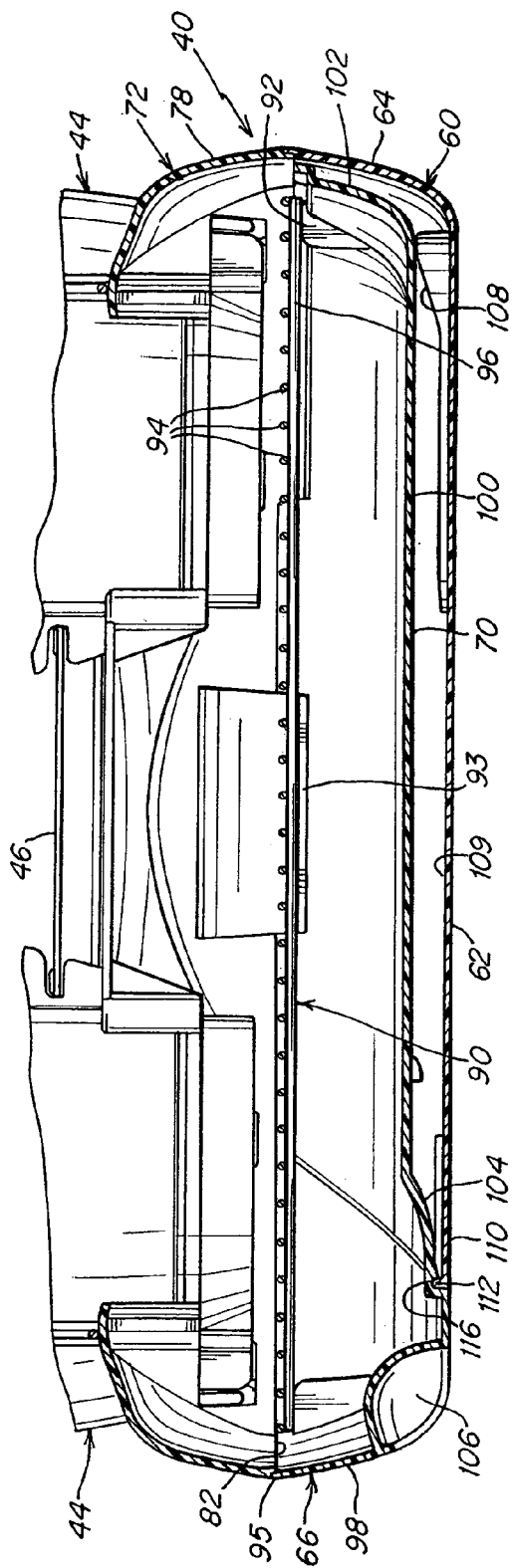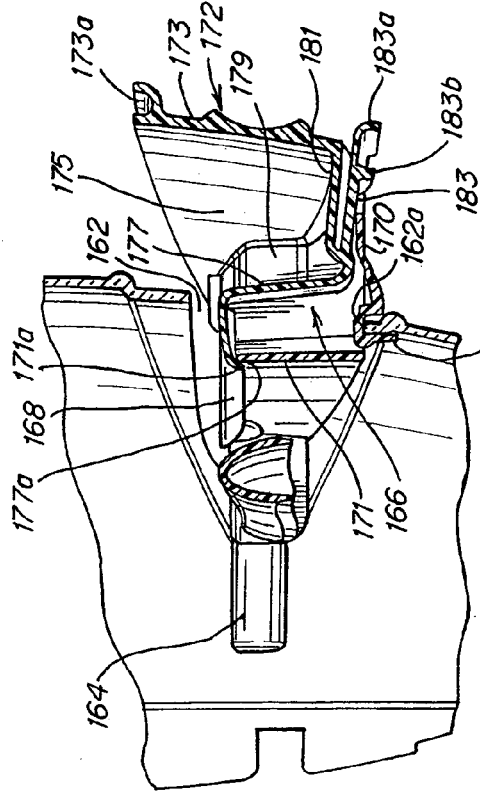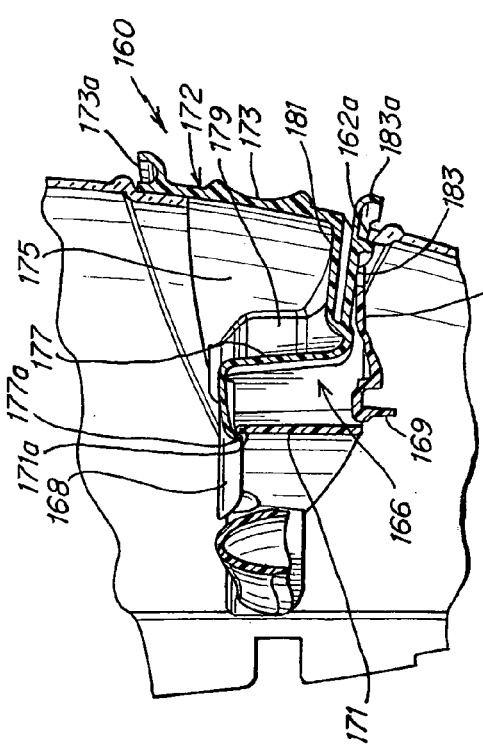

BIRD CAGE

RELATED APPLICATIONS

This application is a continuation and claims the benefit under 35 U.S.C. §120 of U.S. Pat. No. 6,923,143, granted Aug. 2, 2005 and U.S. Pat. No. 6,715,445 granted on Apr. 6, 2004, each entitled "BIRD CAGE," and which is herein incorporated by reference in its entirety.

FIELD OF THE INVENTION

This invention relates to bird cages and more particularly to many aspects of cages that provide substantial advantages over the cages of the prior art. Various aspects of the present invention are briefly described in this introduction with references to the prior art.

BACKGROUND AND SUMMARY OF THE INVENTION

In accordance with one aspect of this invention, the bird cage is designed to retain a very high percentage of waste generated by the bird or birds in the cage rather than allowing the waste to be ejected from the cage into the surrounding area. This is accomplished by means of a special bird cage base assembly that includes a baffle configuration about its periphery that prevents the waste from flying out of the cage as the bird flaps its wings flying about in the cage. In addition, the cage includes corner towers that also act as shields or baffles to prevent seed shells generated while a bird is feeding from being ejected out of the cage.

In accordance with another aspect of the present invention, the base includes a unique drawer configured to cause all of the waste generated in the cage to drop into it. This is achieved by making the drawer with a greater area than the foot print of the living space within the cage. This arrangement not only prevents the waste from being ejected from the cage onto the floor, but also prevents the waste from falling into the base of the cage. Consequently the owner of the cage need only clean the drawer and does not need to dismantle the cage to clean both the base and the drawer.

Another aspect of the present invention is to configure the cage so that the birds in it may be seen clearly from any angle, either through the wire grills that define the sides of the cage or through the towers that form part of the cage frame. This is accomplished by making the towers of light pervious material such as transparent or translucent plastic that produces a bay window effect so that the birds in the cage may be seen clearly through the towers themselves at the cage corners. This construction avoids the prison-like feeling of the typical prior art bird cages while retaining the wire grills for improved ventilation and further enables a bird to climb everywhere in the cage.

In accordance with another aspect of the invention, feeding stations are provided for the bird which are accessible from the outside of the cage. A seed cup support moves between a first position to define a perch for a bird when the seed cup is in place on the support within the cage, and a second position to block the opening in the cage in which the feeding station is mounted, when the seed cup is withdrawn from the cage interior. In accordance with the preferred embodiment of this aspect of the invention, feeding stations are provided in the four towers at the corners of the cage.

As yet another aspect of the invention, in accordance with one embodiment of the invention, the bird cage is provided with perches that may be oriented in alternative positions on the towers so as to position the bird either closer to or remote from the tower wall. This is accomplished by providing the perches with a bowed configuration and with fasteners that engage fasteners in the towers or in the seed cups. In one position, the bowed perches curve away from the towers so as to position a bird standing on them further away from the tower wall and in an alternative position in which the curve extends closer to the tower wall and positions the bird close to the tower. The tower acts as a window and allows a full view of the bird.

The wire grills that define the sides, front and back of the cage are all individually removable. For ease of manufacture, the grills are all generally rectangular in shape and easily snap in and out of connectors in the towers. A removable top grill is also incorporated into the cover assembly of the cage. When in place, the cover creates a large arc in the grill for tension so that the top grill remains in place. The open configuration provided by the top grill further enhances the visibility of the cage interior, maximizes air circulation, increases the climbing area for the birds, increases the volume of the cage and follows the normal flight path of a bird within the cage.

Yet another aspect of the present invention resides in the configuration and operation of a wire grill door or doors that are of maximum width for easy entry and egress for the bird or birds to and from the cage interior. Furthermore, the doors are mounted so that they may pivot outwardly or inwardly with respect to the cage. When opened outwardly, the wire grill door hangs close to the side of the cage and does not extend outwardly a great distance from the cage. This avoids the likelihood of anyone accidentally hitting the door and either injuring him or herself or damaging the cage. The ability to fold the wire grill door inwardly is particularly advantageous when the bird cage is left open to allow the bird or birds to fly freely in and out of the cage, as the door provides a convenient landing area inside the cage when the bird returns to the cage. If when standing on the inwardly folded door, the bird creates droppings, the droppings will fall to the base assembly and land in the drawer rather than be ejected onto the floor. Also, when the door is folded inwardly, it provides a labyrinth for a bird when climbing as the bird can climb on both the upper and lower surfaces of the horizontal door.

In accordance with yet another aspect of the present invention, a bottom wire is provided in the cage supported in a removable drawer forming part of the base assembly. By opening the drawer just a few inches, the bottom wire may be withdrawn for cleaning or any other purpose. In most prior art cages, the bottom wire may be removed only by removing the cover of the cage, which is awkward and requires the removal of the birds from the cage.

Yet another aspect of the present invention resides in the unique cage cover that incorporates a carrying handle that enables the cage to be hung from the ceiling. The cover is principally defined by a peripheral frame and the cover grill. The grill defines a landing area for the bird when left to fly about the room in which the cage is located. The contours of the cage cover frame are not suitable for a bird to stand on so that the bird will stand only on the wire grill, causing its droppings to enter the cage and be collected in the drawer.

In accordance with yet another aspect of the present invention, the cage may be expanded so as to increase it capacity. In accordance with one embodiment thereof, this is achieved simply by removing the cover assembly of the cage and mounting an additional set of towers that may be substantially identical to the original towers already incorporated into the cage, and reconnecting the cover to the tops of the added towers. Additional wire grills may be connected to the new upper section of the cage so as to complete the expansion. The additional towers may include additional feeding stations, and adapters may be employed to mount the additional towers on the originals.

Another aspect of the present invention is the modular construction of the cage which enables it to be shipped and stored in pieces and yet is easy for the consumer to assemble and disassemble.

Another aspect of the present invention is the ability of the bird cage to function as a stand alone on the floor or on a table or on a matching stand which is also of knock-down construction. The stand in accordance with this aspect of the invention preferably includes a storage compartment for seed bags or other material used in connection with the cage, and the stand may be filled with bagged sand or a bags of water so as to increase its stability.

The various aspects of the present invention will be better understood and appreciated from the following detailed description read in connection with the accompanying drawings.

BRIEF DESCRIPTION OF THE DRAWINGS

FIGS. 4–6 are fragmentary cross-sectional views of the base assembly of the cage, respectively showing the tray assembly open so that the bottom grill may be removed, partially closed and fully closed;

FIGS. 7 and 8 are fragmentary cross-sectional views taken through one of the feeding stations and showing a seed cup and holder in their closed and open positions respectively;

DETAILED DESCRIPTION

Figure 1:
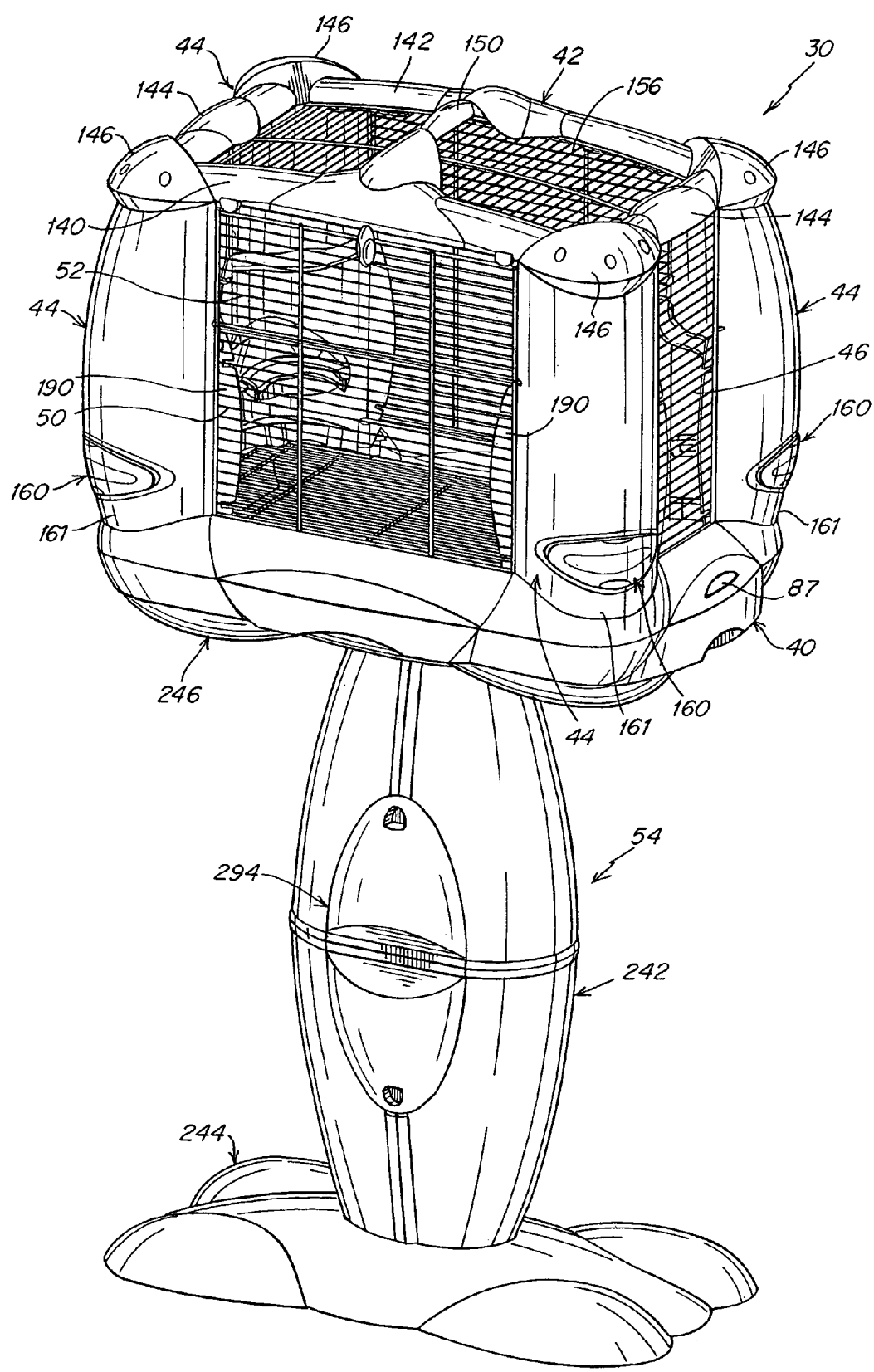
FIG. 1 is a front perspective view of one embodiment of a bird cage and stand constructed in accordance with an embodiment of this invention.

The knock-down bird cage 30 shown in the drawings includes in its general organization a base assembly 40, cover assembly 42, corner tower assemblies 44, side grills 46, back grill 48 and front grill 50. The front grill 50 along with a door grill 52 disposed above it, together with the back and side grills 46 and 48 enclose the front, back and sides of the cage. The base and cover assemblies 40 and 42 along with the corner towers 44 comprise the frame of the cage. In many of the views of the invention shown in the drawings, one or more grills is removed so as to enable the other parts of the assembly to be easily viewed. In FIG. 1 the cage 30 is shown supported on a stand 54 but it is to be understood that the cage may be used without a stand and rest on any flat surface such as a table or floor, or it may be supported from above, or it may be used with stands of alternative configurations. The various parts identified above are described in greater detail below.

Figure 3:
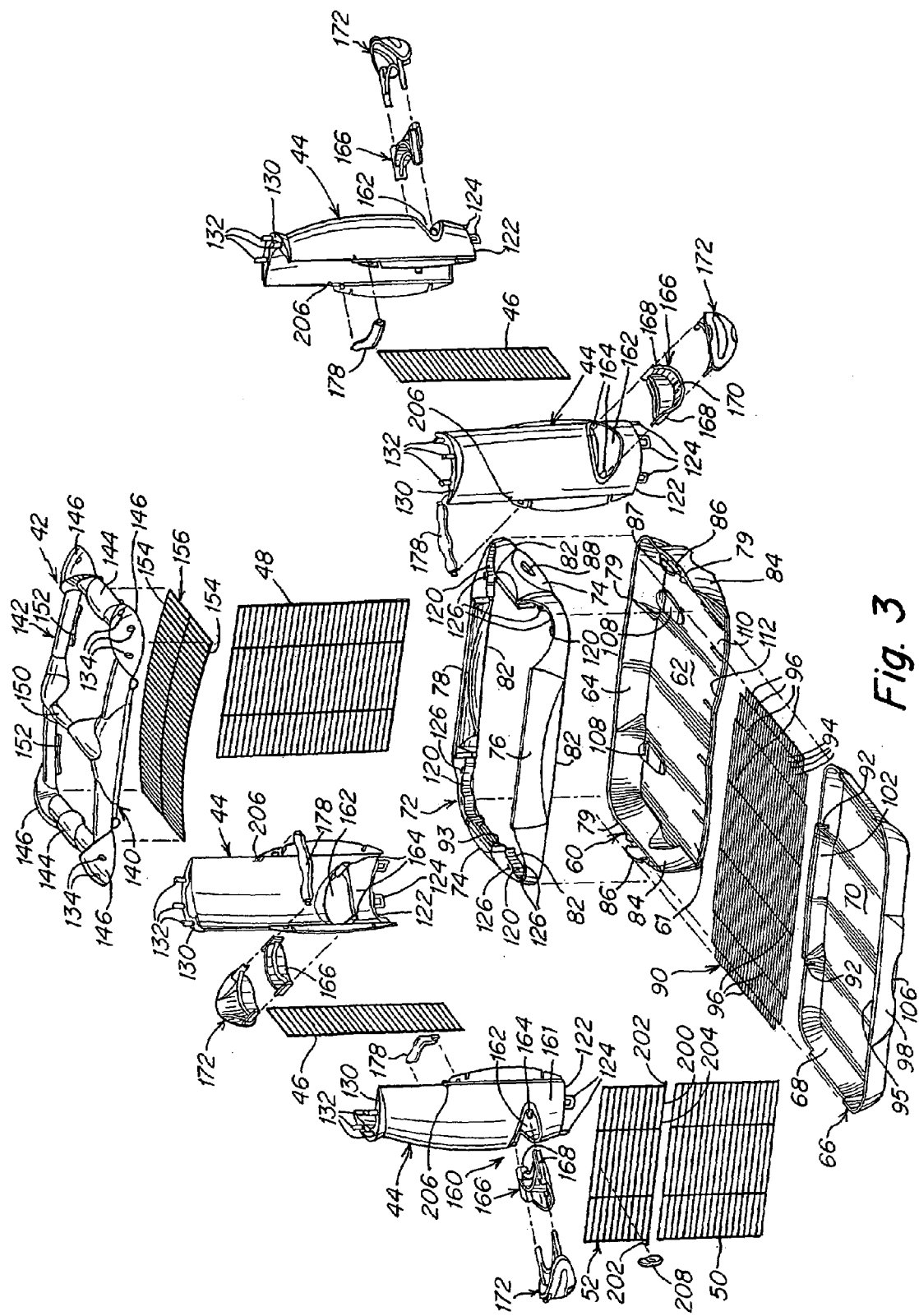
FIG. 3 is a fully exploded perspective view of the cage shown in FIGS. 1 and 2.

The base assembly 40 in accordance with one embodiment of the invention shown in detail in FIGS. 3–6 includes a base 60, tray 66, guard 72 and bottom grill 90. The base 60 has a bottom wall 62 and a side wall 64 that extends about the sides and rear of the bottom wall. The front 61 of the base 60 is open (unobstructed by the side wall 64) to enable the tray 66 to slide in and out of the base. The tray 66 includes a peripheral side wall 68 that extends about the four sides of the tray bottom wall 70. The guard 72 in this embodiment is in the form of an open frame having side portions 74 and front and rear portions 76 and 78. The guard 72 sits on the base 60 with the upper edges 79 of the base side wall 64 and the lower edges 82 of the side, front and rear wall portions 74, 76 and 78 of the guard engaging one another. As shown in FIG. 3, the side portions 84 of the side wall 64 of base 60 carry upwardly extending connecting members 86 that engage openings 88 in the side wall portions 74 of the guard so as to retain the base and guard in assembled relationship. The connecting members 86 shown have hook-like flanges 87 that extend into the openings 88, but it is to be understood that many other types of connectors known in the art may be employed such as screws, brackets etc. and the connections may be made on other than or in addition to the sides of the base 60 and guard 72. The base 60 and guard 72 are not ordinarily separated from one another once they are initially assembled together.

In accordance with this embodiment of the invention, the base grill 90 rests on the flanges 92 on the rear wall section 102 of the tray 66 and on the flanges 93 on the side portions 74 of the guard 72. The grill 90 is composed of a series of parallel wires 94 running side to side in the cage, and are joined together by a number of heavier cross wires 96 that extend front to back. The wire grill 90 is releasably retained in the assembled position on the tray 66 and within the base 60 by the tops of the front and rear sections 98 and 102 of the tray side wall 68, that extend above the height of the grill 90 when the drawer is fully inserted in the base. (see FIG. 6)

In FIGS. 4–6, the manner in which the tray 66 is supported on the base 60, the way the tray opens and closes and the way the bottom grill 90 is removed are shown in detail. As suggested in those figures, the grill 90 is removed from the base assembly 40 by partially withdrawing the tray 66. The tray bottom wall 70 has a flat major portion 100 that extends from the rear section 102 of its peripheral wall 68 toward the front 98 and merges smoothly into a downwardly extending ramp 104 to a point behind finger grip 106 in the front section 98. The bottom wall 62 of the base 60 carries ramps 108 on its top surface 109 adjacent the rear of wall 64 (see the exploded view of FIG. 3) that cooperate with the bottom wall 70 of the tray so as to cause the tray to elevate when fully inserted in the base 60 and to drop slightly when the drawer is withdrawn a few inches from the base 60 (compare FIGS. 4 and 5). The ramps 108 in the base 60 act on the bottom wall 70 of the tray and the ramp 104 at the front of the tray acts on the ledge 112 at the front 110 of the bottom wall 62 of the base to cause the tray to elevate when it is fully inserted within the base as in FIG. 6. When fully inserted, the tray traps the bottom grill 90 below the top edge of the front section 98 of the tray so that the grill may not be withdrawn. It will be noted in FIG. 4 that when the tray is opened a few inches so that its bottom wall slides off the ramps 108 and the ramp 104 drops off the front ledge 112 of the base, the tray assumes a lower position freeing the bottom wire grill 90 so that it may be slipped out from under the edge 82 of the guard 72 and over the front wall 98 of the tray. When the tray is fully inserted as in FIG. 6, the front edge 95 of the tray side wall moves into very close proximity to the lower edge 82 of the guard, and the bottom grill 90 is trapped in position.

It will be noted in FIG. 6 that the front edge 112 of the base bottom wall 62 engages a notch 116 at the forward end of the ramp 104 so as to releasably hold the tray in its innermost retracted position in the base. A slight pull on the handle 106, however, will overcome the resistance created by the engagement of the edge 112 with the notch 116 so as to extend the tray and the bottom grill 90 or to fully withdraw the tray with the grill from the base 60 for cleaning etc. The grill 90 will remain supported on the guard flanges 93 but may be lifted from it when the draw is withdrawing a few inches.

The design of the base assembly 40 is intended to prevent bird waste from being ejected out of the cage when a bird or birds moves about in it. The configuration of the peripheral walls 74, 76 and 78 of the guard 72 together with the side wall 64 of the base 60 and the peripheral wall 68 of the tray form a C-shaped baffle about the four sides of the base assembly 40 to retain the bird waste in the cage. Any waste propelled about the cage which hits the side walls of the base assembly will remain in the cage base assembly 40 rather then ejected out of the cage and onto the floor or other surrounding surface. This feature is evident in FIG. 1. It is also evident in FIG. 1 that the area of the footprint of the cage proper defined by the towers 44 and side, back and front grills 46, 48, and 50 (with the door 52) is substantially smaller than the area of the base assembly and therefore bird droppings will fall within the guard 72 into the tray 60.

To further insure against droppings or other waste being ejected from the cage, in accordance with the embodiment of base assembly shown in FIGS. 4A and 5A slide locks 101 and 103 are provided on the front and back, respectively, of the base assembly 40a. The lock brackets 101 and 103 insure against a gap forming at the front of the base assembly between the lower edge of the guard 72a and the top edge of the tray 66a and at the back of the base assembly between the lower edge of the guard 72a and the top edge of the base 64a. In this embodiment, the lock 101 is slidably carried by a T-shaped flange 105 on the tray 66a, that engages the J-shaped flange 107 on the guard, and similar flanges for the lock 103 are also provided on the base 64a and 72a at the back of the base assembly. To slide the tray outwardly from the base, the front slide lock must be opened. While this specific locking arrangement is illustrated, it is to be understood that other devices may be used to accomplish the same purpose such as clips, bracket, hinged closures, etc.

Figure 2:
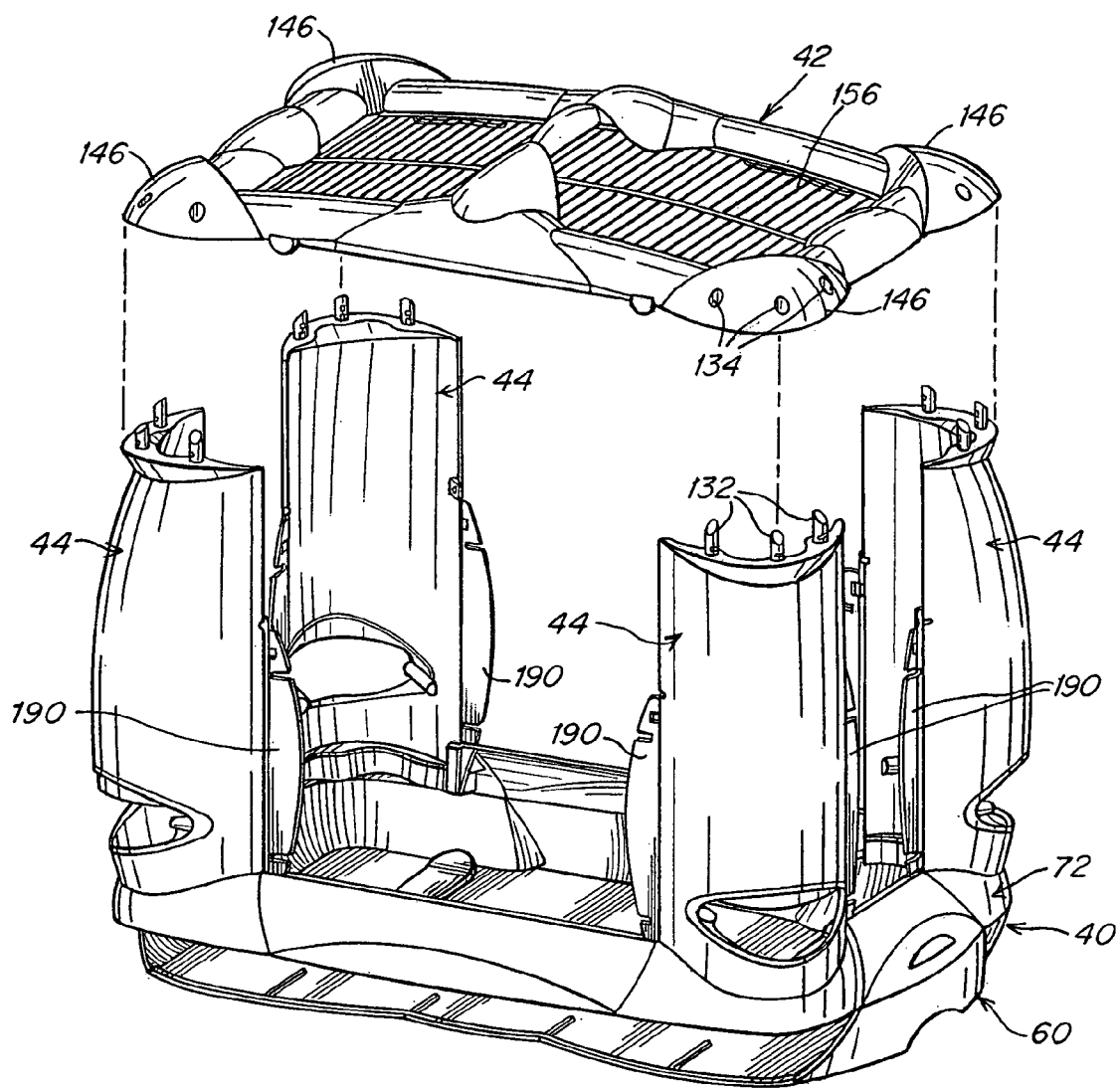
FIG. 2 is a partially exploded perspective view of the cover, towers, and base of the cage of FIG. 1.

Each of the towers 44 at the corners of the cage are preferably made of a transparent plastic material such as polystyrene or some other light pervious, suitable material either transparent or translucent, so as to create a bay window effect and enable birds inside the cage to see the entire surrounding area while at the same time allowing an observer to view the birds without steel wire grills interfering with the view. The plastic material may also be tinted. As shown in FIGS. 2 and 3, each tower 44 has an arcuate shape that compliments the arcuate recesses 120 at each of the corners of the base guard 72. In this embodiment the lower edge 122 of each tower carries a number of connectors 124 that mate with receptacles 126 about the margins of the curved corners 120 of the guard so as to releasably secure the towers in place. The upper edge 130 of each tower also carries one or more connectors 132 that register with openings 134 at the corners of the cover assembly 42 as described more fully below.

The cover assembly 42 is generally rectangular in plan view and has front and rear portions 140 and 142 and side portions 144 that together form the cover frame. The front, rear and side portions 140, 142 and 144 are joined at the rounded corner pieces 146 that carry the openings 134 that receive the connectors 132 on the tops of the towers.

Figure 3A:
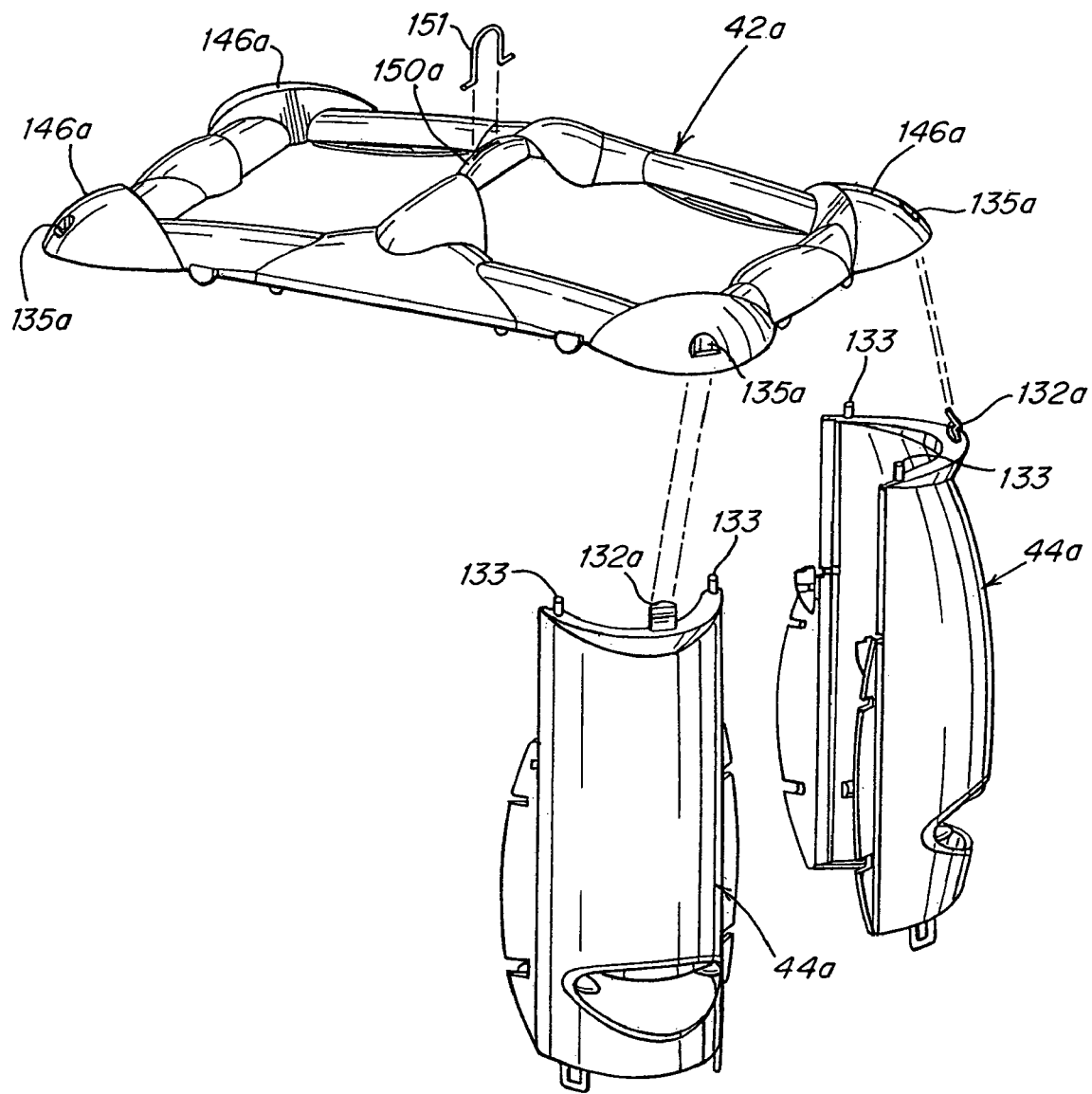
FIG. 3A is an exploded view of a portion of another embodiment of cage in accordance with this invention.

Another embodiment shown in FIG. 3A includes a single connector 132a on the center of the top of the tower 44a, and aligning pins 133 at each end of the tower top. Complimentary recesses 135a are shown in the corner pieces 146a of the cover 42a to receive the connectors 132a, and openings (not shown) receive the aligning pins.

A carrying handle 150 extends between the intermediate sections of the front and rear portions 140 and 142 of the cover 42. In FIG. 3A and hanger 151 is also shown that may connect to the handle to enable the cage to be suspended from above. The front and rear portions 140 and 142 also carry tracks 152 (see FIG. 3) that receive the front and rear edges 154 of the top wire grill 156. The grill 156 preferably is rectangular and formed flat so that it is easy to manufacture. When the top grill 156 slides into the tracks 152, the grill bows slightly from side to side to create tension between the wire grill and the tracks of the cover so that the grill is held firmly in place. The top grill 156 enhances ventilation of the cage, provides a landing area for birds when left out of the cage to fly about a room, and affords a climbing surface for birds inside the cage. The rounded contour of the cover frame comprised of the front and rear portions 140 and 142, the side portions 144, the corner pieces 146 and the handle 150 do not provide an inviting platform for the birds outside the cage, and they will prefer resting on the grill 156. Because the birds stand on the grill rather than the cover assembly frame, their droppings will fall into the cage through the grill and onto the tray 66 of the base assembly and not soil the surrounding area. The cover assembly preferably is made of a molded plastic such as polystyrene or other suitable material like that of the tower 44, base 60, tray 66 and guard 72. The front, back and side portions 140, 142 and 144 along with the corner pieces 146 and handle 150 may be formed as a unitary structure, or alternatively, the various pieces may be separately fabricated and assembled together.

Each of the towers 44 has a feeding station 160, located in the illustrated embodiment of FIG. 1 adjacent its lower end 161. The towers carry the stations in openings 162 (see FIGS. 3 and 7–9). Each opening 162 has tracks 164 along its sides that support a seed drawer 166 by means of the outwardly extending flanges 168 on each side thereof that slidably engage the tracks. The drawer 166 has a generally U-shaped platform 170 that supports a seed cup 172. The cups 172 that hold the seed may slide in and out of the drawers for cleaning and filling. In accordance with one embodiment of the invention, the drawer may be held in place by a spring latch 169 on the platform 170 that engages the bottom edge 162a of opening 162 when the drawer is in its outer position, as shown in FIG. 8. The drawer has a curved wall 171 that extends upwardly from the platform and is aligned approximately with the opening when the drawer is in outer position of FIG. 8, and the wall 171 serves as a gate in the opening to prevent birds from leaving the cage when the seed cup 172 is removed from the drawer. The seed cup in turn has an outside curved wall 173 that conforms in shape and size to the opening 162 so that when the cup is fully inserted into the cage causing the drawer to move inwardly with it on the tracks 168, the opening 162 is also closed as shown in FIG. 7. The seed cup 172 includes a seed container 175 defined in part by the front curved wall 173 and a shorter inside wall 177 along with side walls 179. In accordance with the embodiment of the invention illustrated in FIGS. 7 and 8, a spring catch 183 disposed beneath the container bottom wall 181 engages the lower edge of the opening when the drawer and seed cup are fully inserted into the opening 162 in the tower 44 to releasably retain the drawer 166 and seed cup 172 in position. The positions of the drawer and cup are shown in their closed and open positions in FIGS. 7 and 8, respectively. In FIG. 8 cup 172 is shown withdrawn to the outside of the tower opening 162 so that it may be filled with seed. The drawer 166 moves with the cup on the tracks 164. The cup 172 may be removed from the drawer by releasing the coupling that connects the two together. In the illustrated embodiment, the front edge 177a of the cup 172, through a portion of its length, overlaps the top edge 171a of the wall 171 of the drawer 166, and to separate the two, the cup need only be lifted at the back so as to allow the overlapping edge to pass over the top 171a of wall 171. Obviously other connecting means may be employed such as snaps, catches, clips etc. may be employed to releasably form the drawer and cup.

To withdraw the seed cup 172 and drawer 166 to the outer position of FIG. 8, the grips 173a and 183a respectively located on the top of front wall 173 of the seed cup and the outer end of the spring 183 are squeezed toward one another so as to lift the flange 183b on the spring bottom above the bottom edge 162a of the opening 162. As the two move together to the extended position, the latch 169 acts as a stop to hold the drawer and seed cup in position. To return the drawer 166 and cup 172 to the position of FIG. 7, the latch 169 which may be in the form of a spring and either integrally formed with or made separately from and attached to the drawer need simply be raised so that it clears the bottom edge 162a of the opening. This action allows the drawer and cup to slide together on the tracks 164 to the innermost position.

Figure 10:
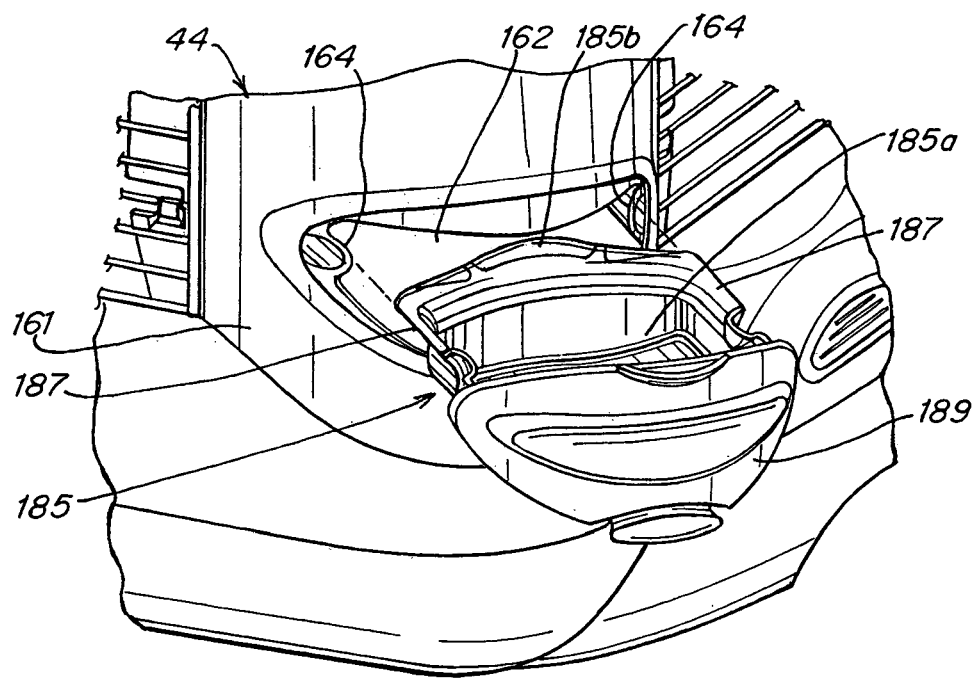
FIG. 10 is a fragmentary perspective view of a bird bath that assembles in the cage.

In FIG. 10 a bath station 185 is shown aligned with the opening 162 in the tower 44. The bath station has side flanges 187 similar to the flanges 168 on the seed cup drawers 166 and a front wall 189 similar to the front wall 173 of the seed cup 173, which enables the bath station to be mounted in the opening 162 when the drawer 166 and seed cup 172 are removed. As is evident in FIG. 11 when the bath station 185 is inserted into the tower 44, its well 185a is readily accessible to birds within the case, and as they bathe in it they may readily be observed through the tower wall. Preferably the bath includes a perch 185b along its inner edge where the bird may alight before entering or after emerging from the bath. The bath station 185 may readily be removed from the tower by sliding its flanges 187 off the tracks 164.

Figure 11:
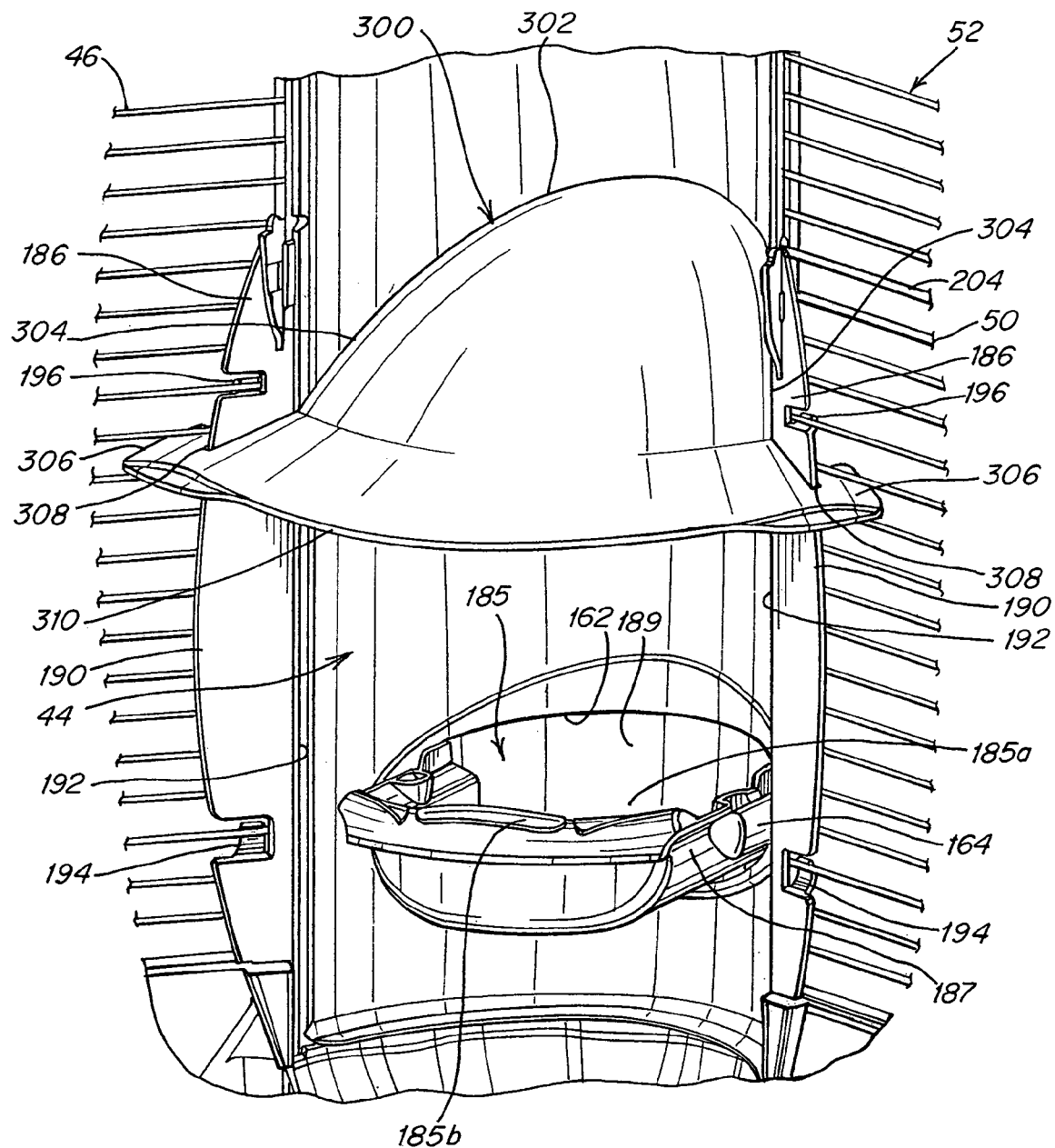
FIG. 11 is a fragmentary perspective view of the cage showing the bird bath mounted in the cage and a bath shield mounted above the bath.

In accordance with another aspect of the invention, a bath shield 300 as suggested in FIG. 11 may be provided in the tower 44 above the bath station 185 to minimize water splashing about within the cage and out of the cage when a bird or birds is bathing. The baffle 300 typically is made as a molded plastic sheet with a curved top edge 302 that generally conforms with the curvature of the tower and has downwardly flared side edges 304 and fins 306 with slots 308 adjacent the bottom edge 310 that engage the wings 190 of the towers 44 and extend between the wires of the grills adjacent each side of the tower so as to be releasably held in place. To mount this form of shield, the grills may first be removed and subsequently reinstalled after the shield is mounted in the tower. The bath shield may be fastened in place in a number of different ways, such as by clamps, clips or brackets either integral with the tower or shield and which engage one of the adjacent components of the cage assembly. Preferably the shield is removable to facilitate cleaning.

Figure 9:
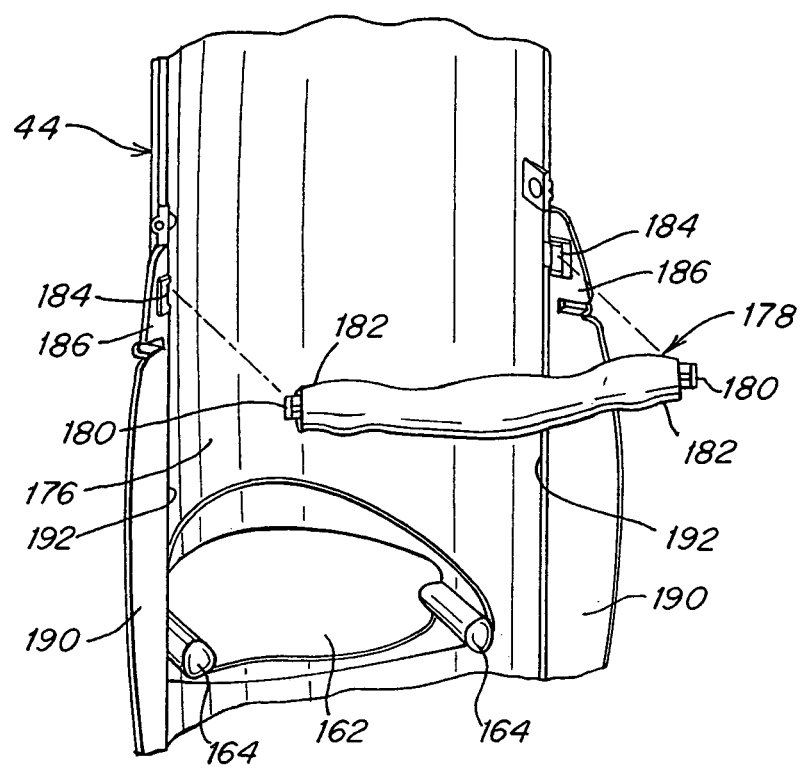
FIG. 9 is a fragmentary perspective view of one of the corner towers and illustrating how a perch may be assembled on the inside thereof in one embodiment of the invention.

A perch 178 is shown in FIG. 9 as it may be mounted on the inside of each tower 44 above the opening 162 that receives the drawer 166, seed cup 172 and bath station 185. The perch 178 is shown to be bowed slightly and can be mounted so as to bow either away from or toward the inner surface 179 of the tower 44. In the embodiment shown, each perch 178 carries a clip 180 at each end 182 that fits within a slot 184 provided in side tabs 186 on the edges of the tower 44. The tabs are flexible enough to be displaced outwardly to enable the clips 180 on the perch 178 to register with the slots 184, and the perches may be reversed to accommodate the size of the birds that are housed in the cage. Because the towers 44 preferably are molded of a transparent plastic, when a bird alights on one of the perches 178 an observer has a particularly close up and unobstructed view of the bird. It will be appreciated that other connectors may be employed to mount perches in the towers. It is also contemplated that feeding perches may be formed as part of the seed cup drawer either as an integral part thereof or separately made and attached to the drawer. The perch should of course be in close proximity to the seed cup.

In FIG. 11 one method of mounting the side, back and front grills 46, 48 and 50 is illustrated. It will be appreciated that while one preferred method is shown, many other methods may be employed. It is highly desirable however that whatever method is used, the grills should be easy to assemble on and remove from the cage frame. In the illustrated embodiments, tower wings 190 are provided on each side edge 192 of each of the towers, and they extend from just below the tabs 186 essentially to the bottom of the towers 44 (see for example, FIGS. 2 and 3). A pair of grill supports 194 and 196 in the form of hooks are formed as an integral part of the wings 190, two on each side thereof, that are designed to fit between adjacent horizontal wires of the grill and hook onto the wires that engage them. Two grill supports 194 and 196 on each side of each grill, spaced apart vertically, are sufficient to hold each grill in place. In a similar fashion the front grill 50 that is approximately half the height of the cage may be held in place by the spaced supports that hook onto the wires. Other fastener means that may be used for mounting the grills include the use of clips, hangers, snap fasteners, brackets, etc.

Figure 12:
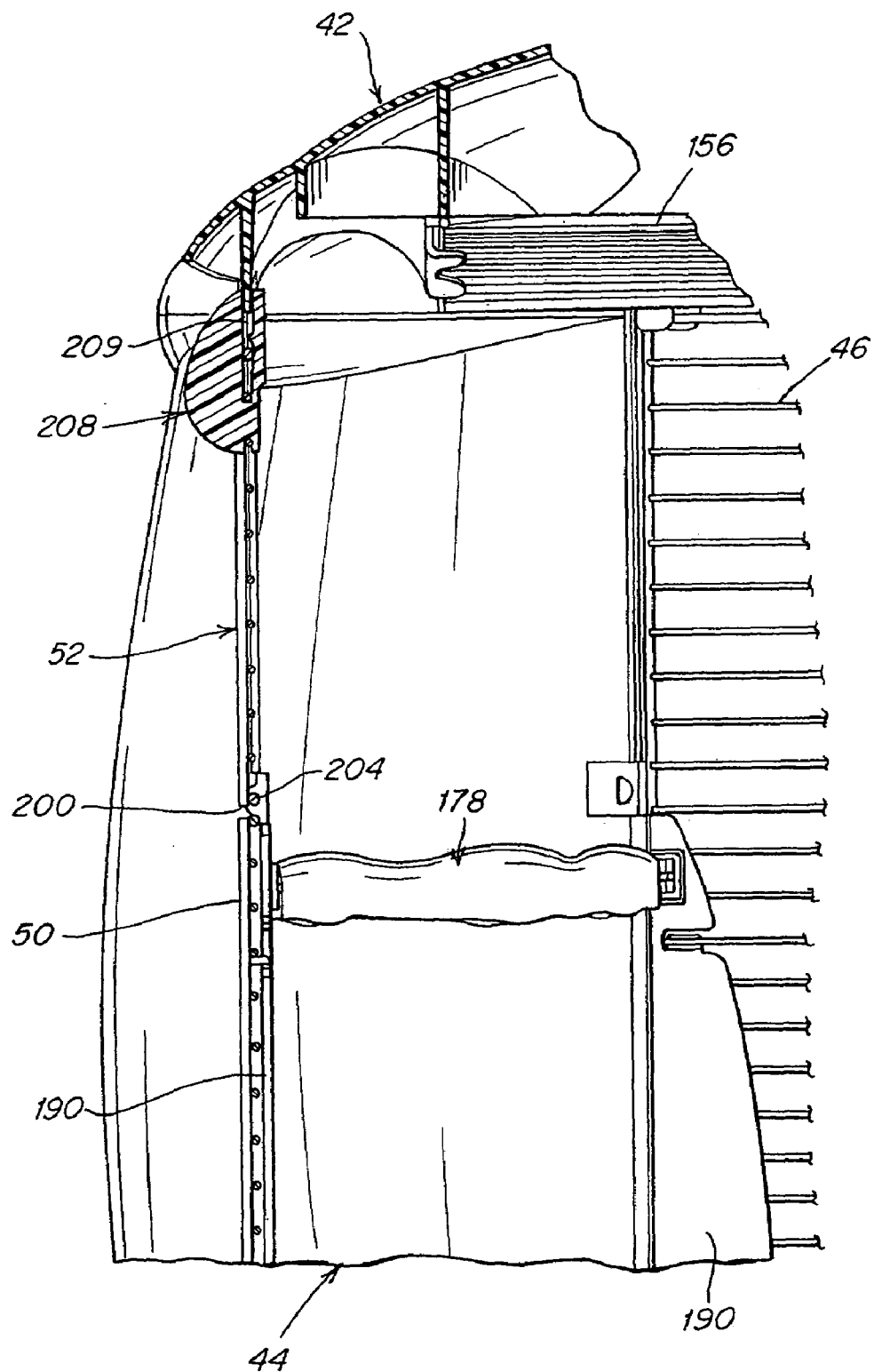
FIGS. 12, 13 and 14 are fragmentary cross-sectional views of the cage and showing the door grill in the closed, inwardly open and outwardly open positions, respectively.
Figure 13:
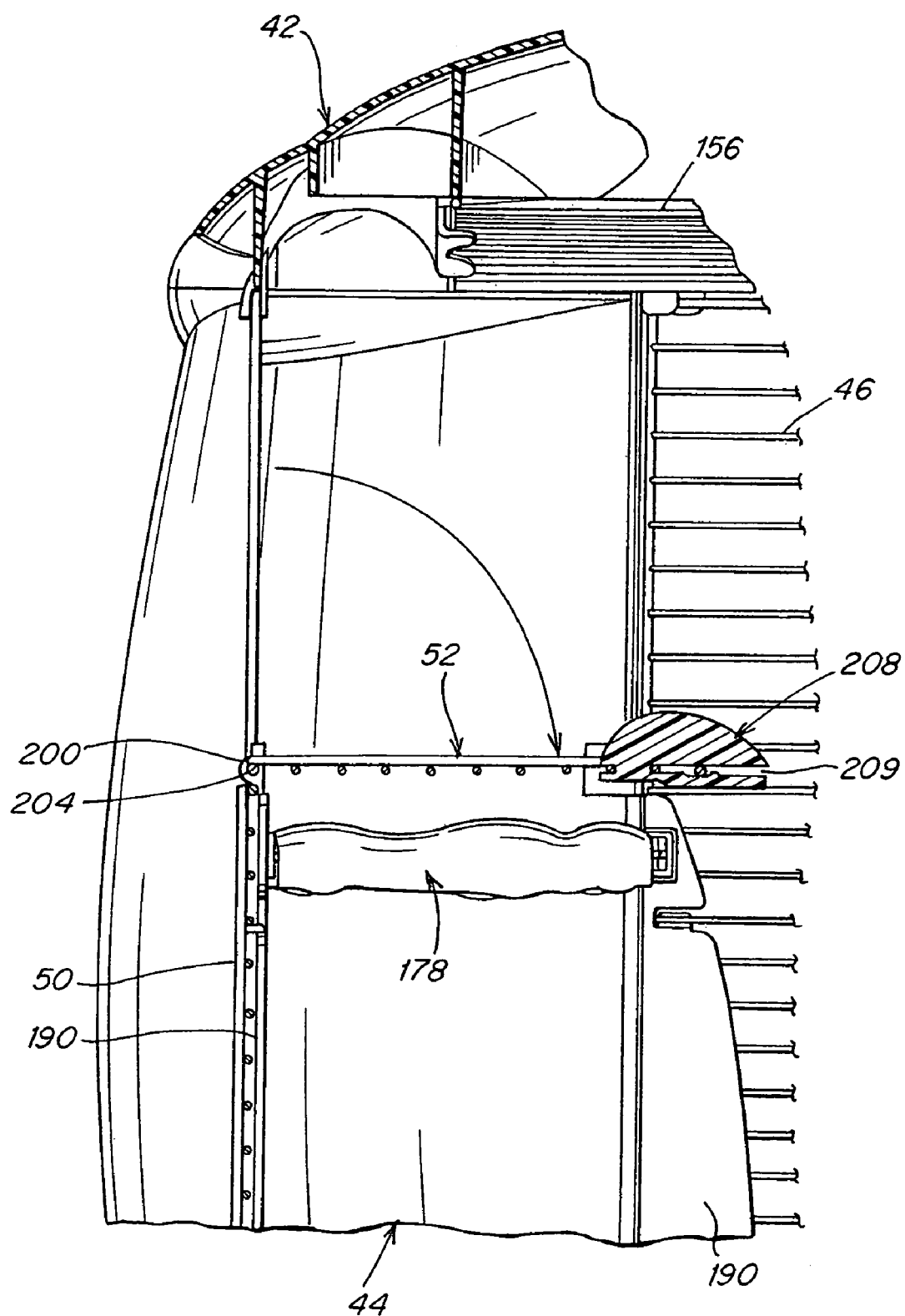
Figure 14:
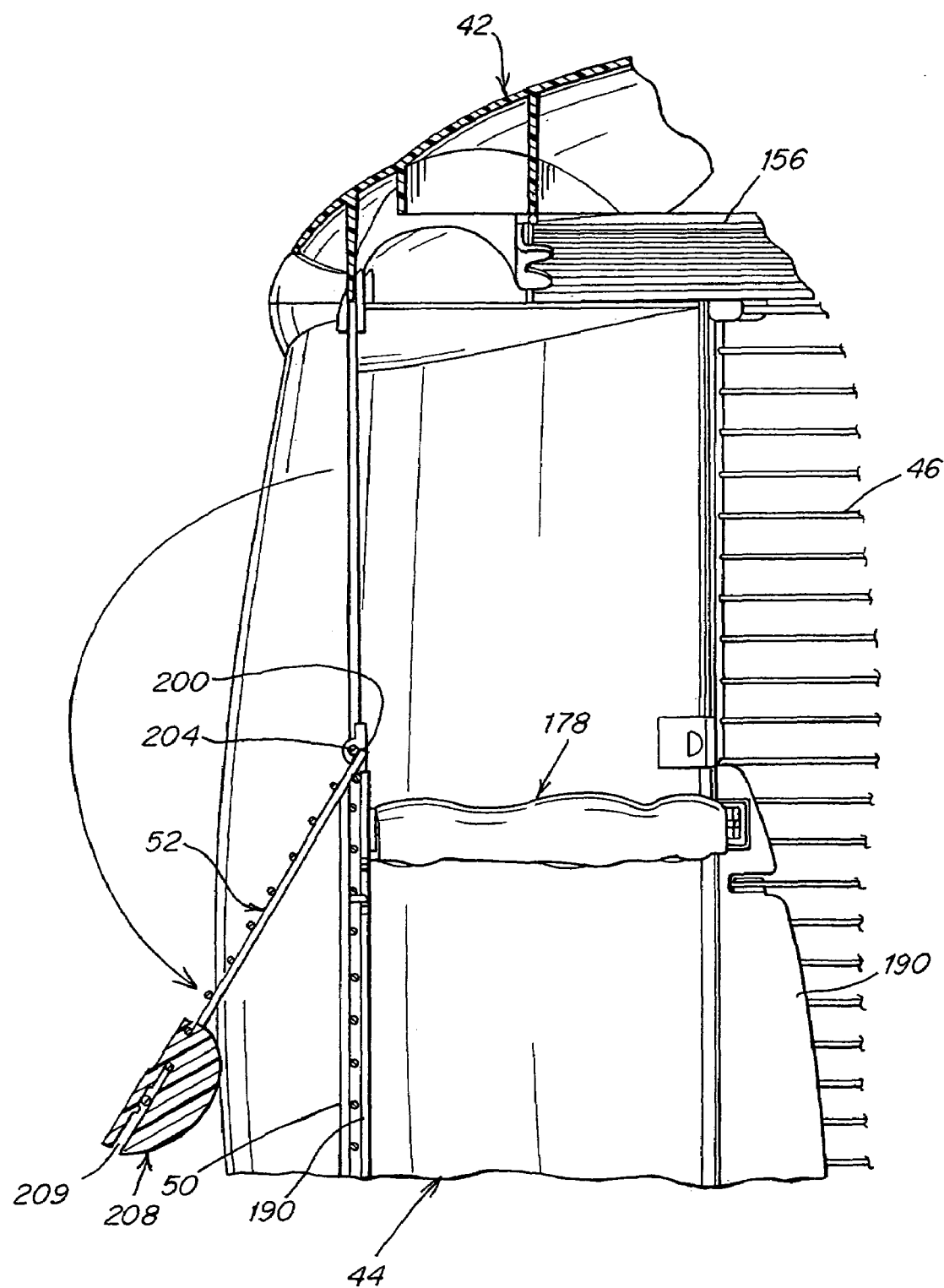

In FIGS. 12–14 another aspect of this invention is shown in detail, relating to the door grill 52. The door grill 52 in accordance with one embodiment of the invention is pivotally supported so that it may move from the closed position of FIG. 12 to either the open position of FIG. 13 wherein it is disposed approximately horizontally in the cage or to the open position of FIG. 14 wherein it hangs down outside the cage. In the specific configuration illustrated, the door is connected along its bottom edge 200 by means of extensions 202 (see FIG. 3) that are formed as part of the bottom wire 204 of the door grill. The extensions 202 are anchored in notches 206 provided along the side edges of the front towers 44 above the wings 190 approximately two thirds of the way up from the base assembly 40. When the door grill is detached from the cage frame at its top, the grill door may pivot downwardly to either of the open positions of FIGS. 13 and 14. The door may be retained in the closed position by a knob or latch 208 carried by the upper wires of the door grill and that engages the cover assembly 42 as shown in FIGS. 1 and 12. The latch is rotated to disengage its slot 209 from the edge of the front portion 140 of the cover when the door is to be opened. When the door is in the position of FIG. 13 opened inwardly it provides a platform within the cage on which a bird may light when returning to the cage through the open door. The inwardly opened door also creates a labyrinth for birds to climb upon and fly about (above and below) for its enjoyment. When similarly mounted doors are provided on the sides of the cage as well, which is an alternative embodiment of this invention, additional landing and labyrinth surfaces are created for the birds' enjoyment.

The door or doors may be supported in the horizontal position in many different ways. For example flanges may be provided on the edges of the towers adjacent the door hinges in the path of the side wires of the grills when they reach the horizontal position so that the door or doors cannot move below that plane. Alternatively, appropriate stops may be built into the hinges to achieve the horizontal orientation, or the door grills may carry stops that engage the towers or the grills below the doors for the same purpose.

In FIG. 14 the door grill 52 is shown in its open position hanging downwardly from the wire hinge extensions 202 on the outside of the cage. When opened in that fashion, the door does not extend a substantial distance into the space surrounding the cage and therefore is not in a position where it is likely to be accidentally bumped, etc. While in the embodiment shown a door is provided only on the front of the cage, the same arrangement as described above may be used to provide doors on either or both of the sides and/or back of the cage, by using shorter fixed grills and mounting grill doors above in the fashion described. The knob 208 shown in the illustrated embodiment (see FIG. 3) preferably has a contoured grip to facilitate grasping it between the thumb and index finger when it is to be turned when locking or unlocking the door. Other forms of latches may be used to perform a similar function such as hooks, snaps, slide bolts, etc.

Figure 15:
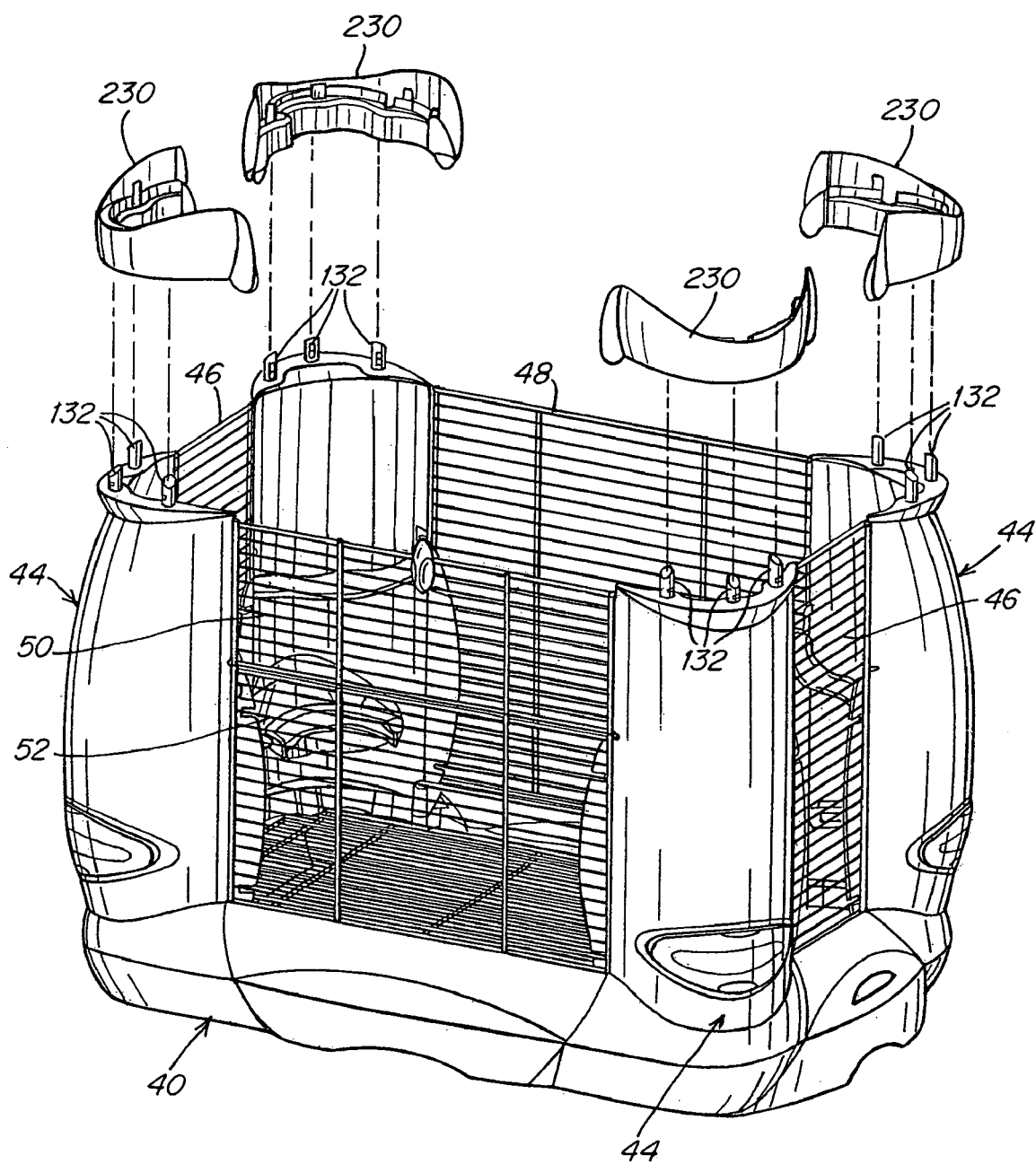
FIGS. 15, 16 and 17 are perspective views of the cage and showing one manner by which the cage may be expanded to increase its capacity.
Figure 16:
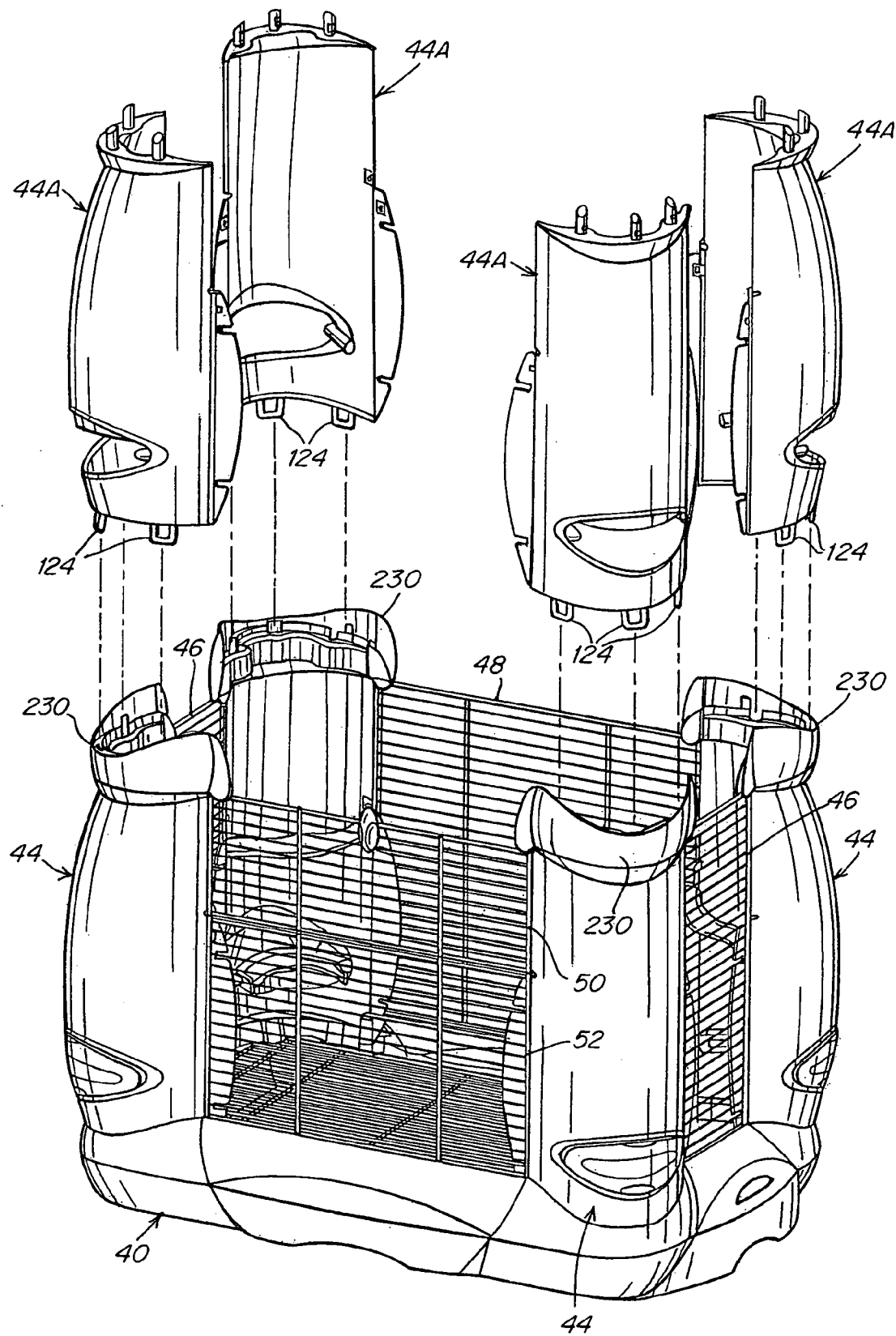
Figure 17:
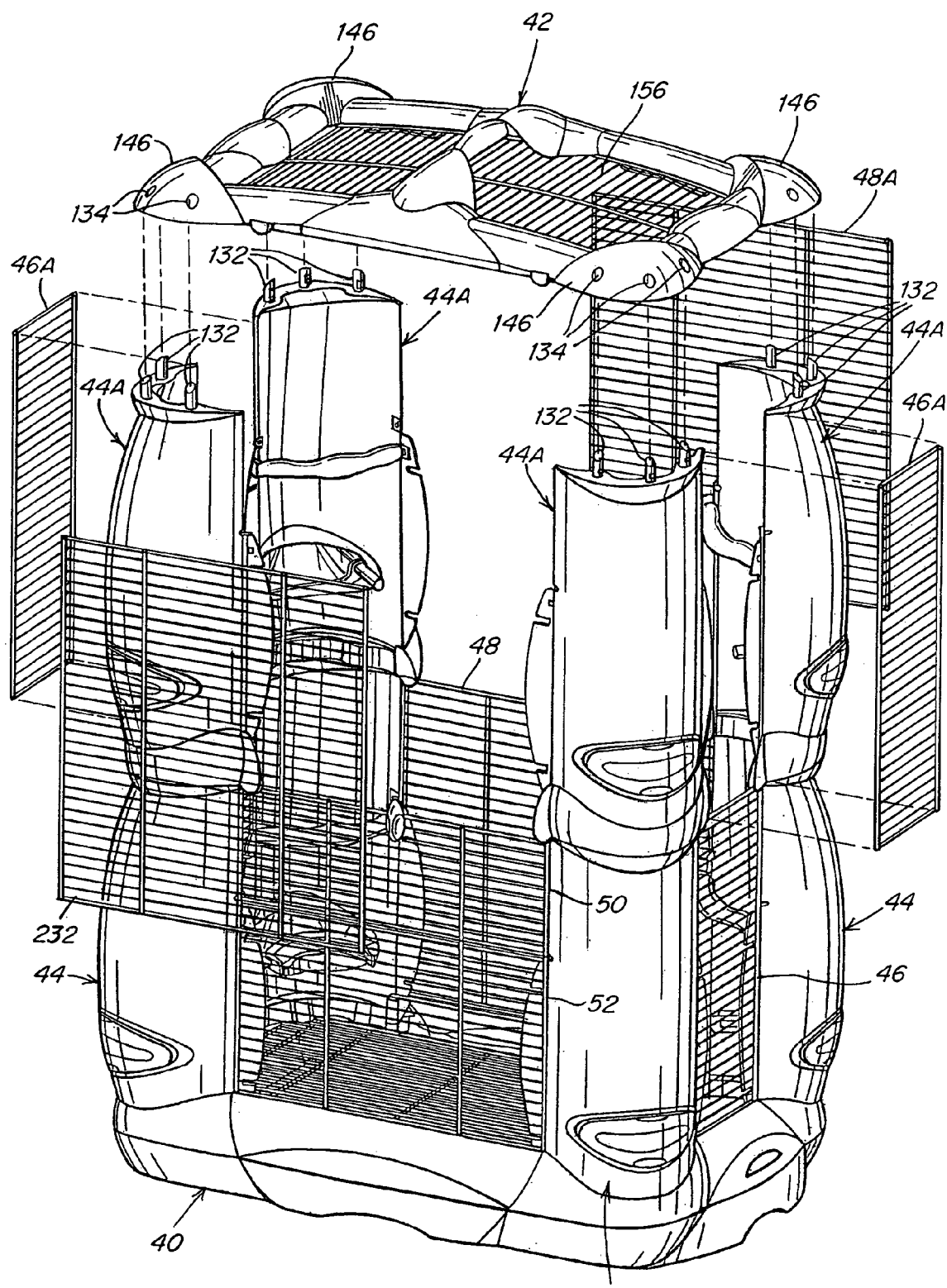

In FIGS. 15 to 17 one way of expanding the cage is illustrated. In accordance with this aspect of the invention, in the illustrated embodiment the height of the cage may be increased readily while utilizing all of the components of the basic bird cage shown, for example, in FIG. 1. The expansion may be achieved by the addition of adapters 230, additional towers 44A that may be identical or very similar to the towers 44 in the original cage, and additional side grills 46A, rear grill 48A and a front grill 232 (or alternatively by a front grill and grill door essentially the same but longer than those employed in the basic cage and described in detail above). To assemble the expansion components onto the basic cage, the cover assembly 42 is removed from the basic cage by releasing the connectors 132 on the tops of the towers 44 from the openings 134 in the corners 146 of the cover and applying to the tops of the towers adapters 230 that include openings (not shown) that receive the connectors 132 on the tops of the towers. One adapter 230 is provided for each tower as suggested in FIG. 15 and shown mounted in place in FIG. 16. The adapters 230 in turn have recesses (not shown) that receive the connectors 124 on the bottoms of the expansion towers 44A so that they may be snapped in place as suggested in FIG. 17. After installation of the additional towers 44A, the cover assembly 42 may be snapped onto the connectors 132 on the tops of the expansion towers 44A in the very same manner that the cover assembly was mounted on the original towers 44. It will be appreciated that the top grill 156 incorporated into the cover assembly 42 may remain in place and no additional top grill is required. When the frame of the cage is assembled in the manner described, the side, rear and front grills, 46A, 48A and 234 may be mounted in place just as described above in the basic cage assembly so as to complete the expansion.

Figure 18:
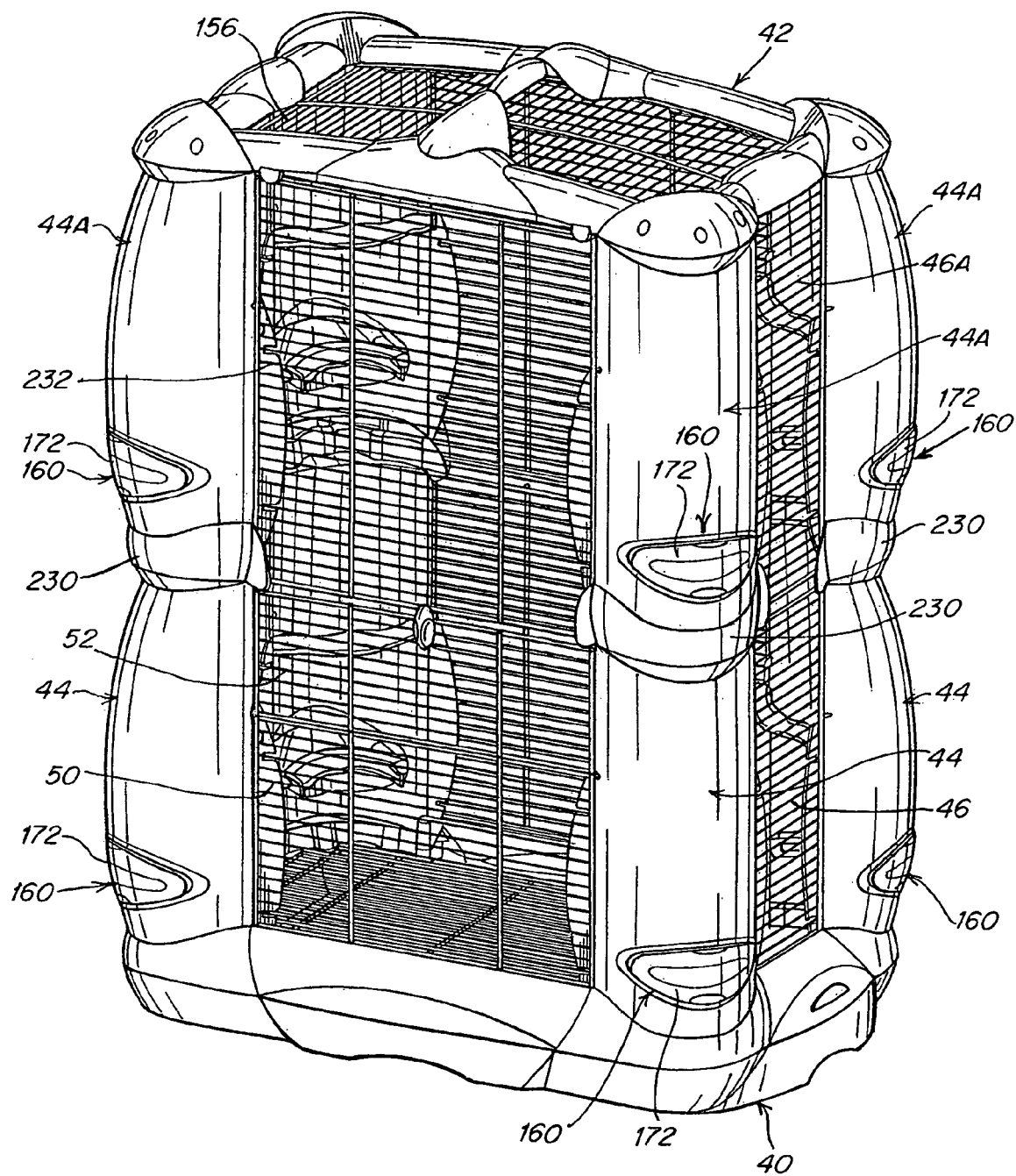
FIG. 18 is a perspective view of a fully assembled expanded configuration of the cage.

It will be appreciated that the adapters 230, expansion towers 44A and grills 46A, 48A and 234 may be sold or otherwise provided as a kit separate from the components of the basic cage. It should also be appreciated that the expansion towers need not be identical to the original towers, which may give rise to different side, rear and front grills, and that the cage may in fact be expanded with more than one additional tier of towers and grills to achieve a wide range of cage sizes. The expansion towers 44A may be offered in a variety of heights either larger or smaller than the originals. Moreover, while the additional towers are shown to include openings for seed cups and drawers, they may be omitted in some or all of the expansion towers. It should also be appreciated that doors may be provided in the front and/or sides of the expanded portion of the cage. A fully assembled, expanded bird cage is shown in FIG. 18.

Figure 19:
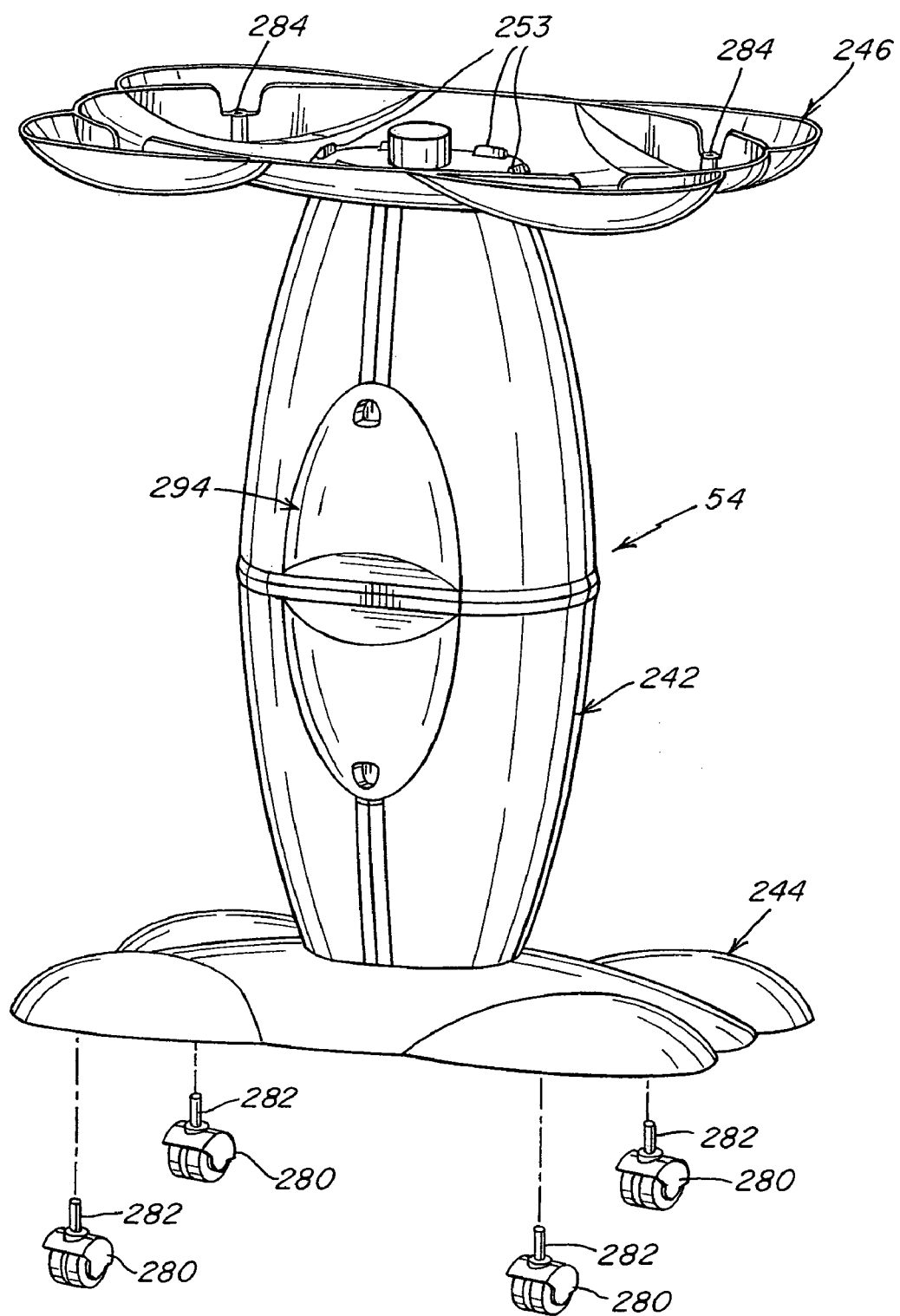
FIG. 19 is a perspective view of a stand for the cage in accordance with another aspect of this invention.

One embodiment of the cage stand 52 is shown in detail and separate from the cage in FIGS. 19–24. In FIG. 19, the stand 54 is shown to include a column 242, base 244 and platform 246. In accordance with this aspect of the invention, the base 244 and platform 246 may be identical, but inverted with respect to one another. However, for smaller versions of the cage, the upper platform 246 may be smaller than the base 244 and they need not be the same.

Figure 20:
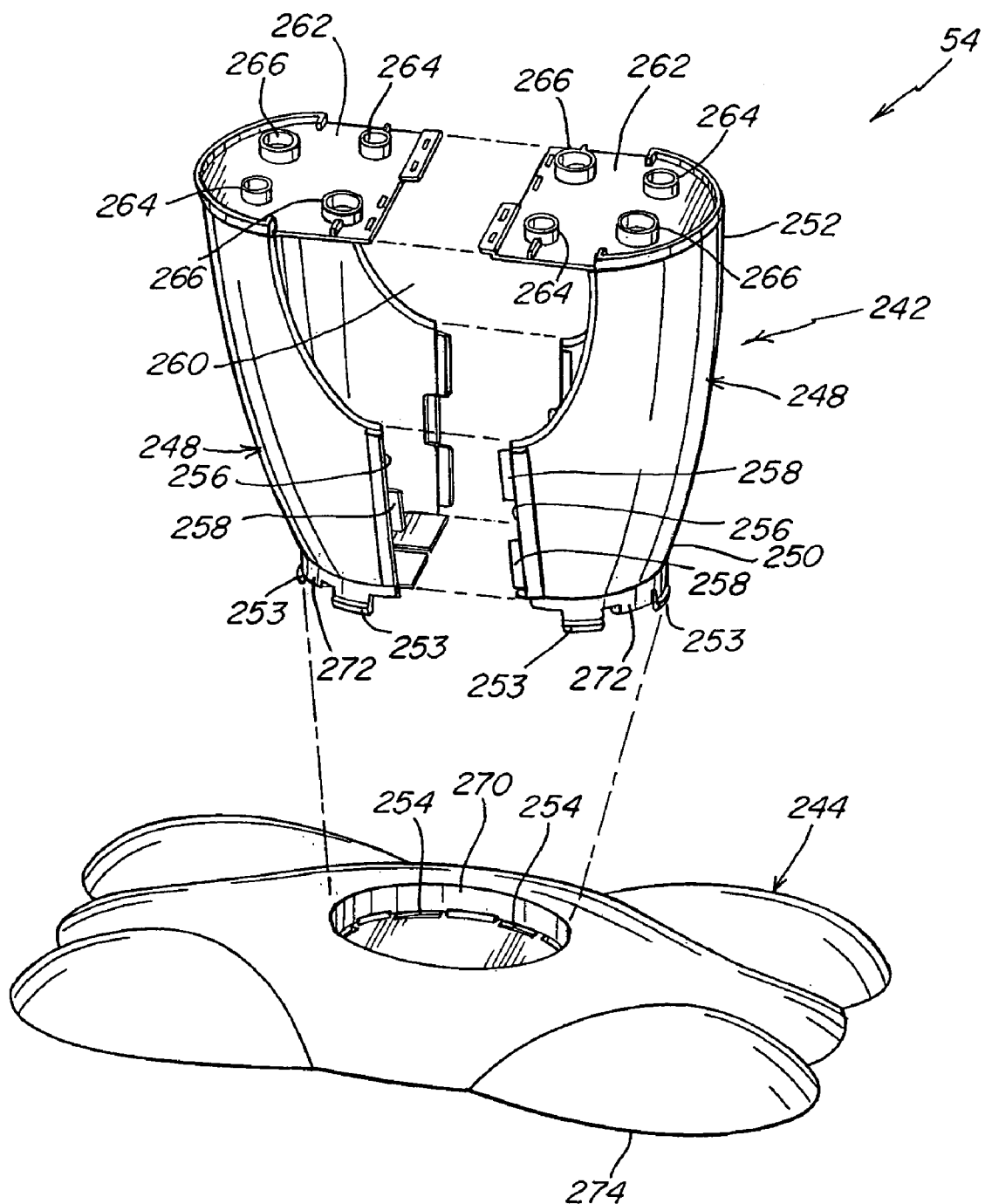
FIGS. 20–22 are perspective views of the stand of FIG. 19 without doors, showing the manner in which the stand is assembled.
Figure 21:
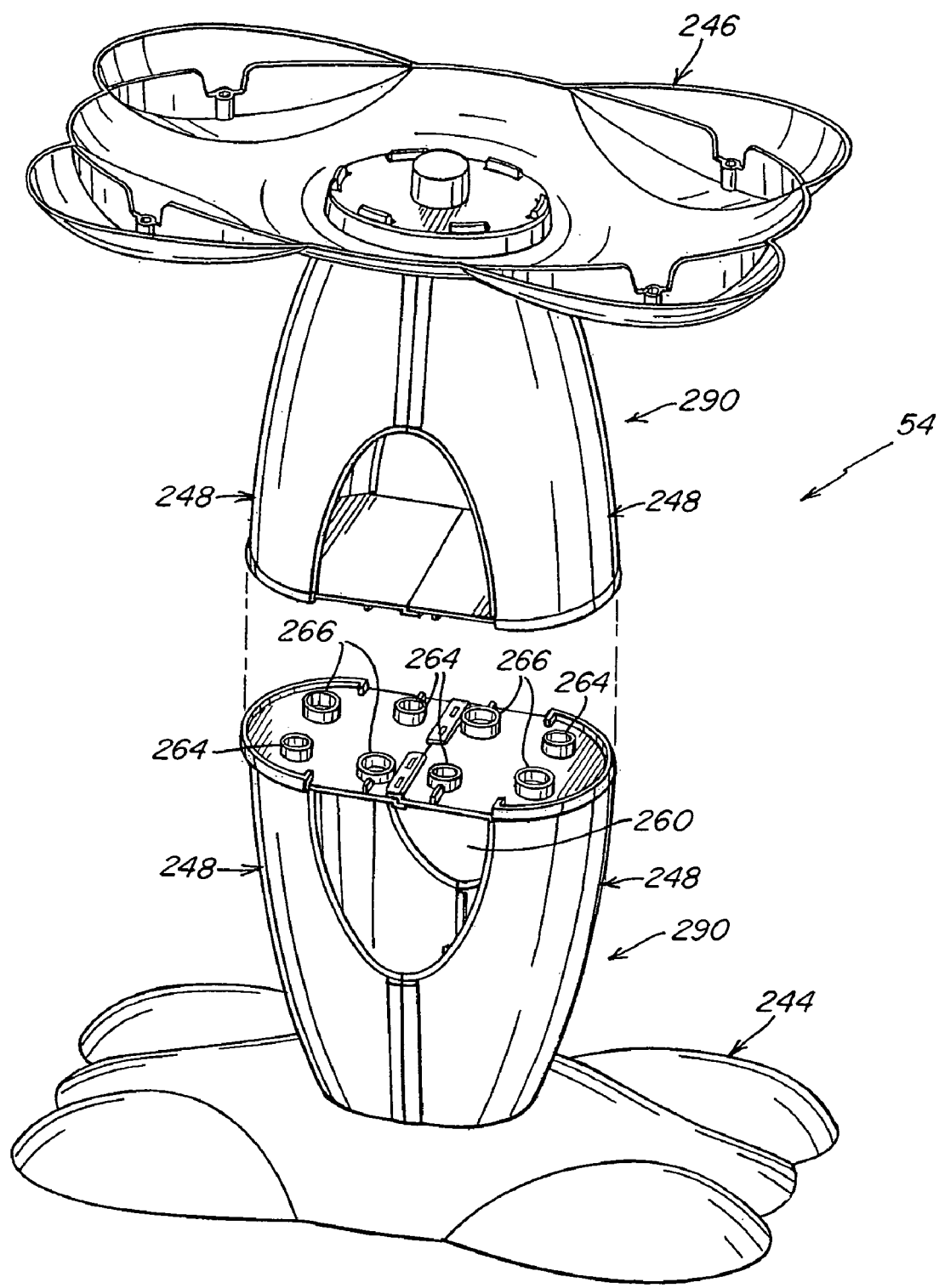

In FIG. 20, the column 242 is shown composed of four components 248 that in the illustrated embodiment are identical to one another but oriented in different positions when assembled to form the column. The base 244, platform 246 and each component 248 preferably are molded plastic parts. The components 248 are each substantially semi-circular or U-shaped in cross-section and gradually increase in size from the smaller to the larger ends 250 and 252, respectively. The smaller end 250 of each component 248 includes several fasteners 252 that extend downwardly when oriented with the smaller diameter end in the lowermost position and which are designed to engage flanges 254 in the base 244 to retain the lower components to the base. Two components 248 define the lower half of the column 242 and two additional inverted components together define the upper half thereof. The side margins 256 of the components 248 carry locking flanges 258 that cooperate with like elements of the adjacent component to assemble two components together. The margins 256 of each component extends approximately one half the height thereof, and the remaining portion of each side edge is relieved so that the adjacent edges define an opening 260. Each component 248 also includes a horizontal wall 262 that essentially closes the larger end 252 of each half column when two adjacent components are assembled together as shown in FIG. 20. The horizontal walls 262 carry small and large diameter collars 264 and 266, respectively that enable two assembled half columns each made up of two components to be joined together, as is described more fully below, to form the full column 242.

The base 244 of the stand has an elliptical opening 270 (see FIG. 20) that receives the flange 272 that carries the fasteners 252 at the smaller end of the assembled pair of components, to enable the fasteners 252 to engage the flanges 254. The base 244 has a horizontal peripheral edge 274 that provides a firm support for the stand when placed on the floor. As suggested in FIG. 19, the base 244 may be provided with swivel casters 280 having posts 282 that are received within sockets 284 in the underside of the base. The sockets are shown in FIG. 19 in the inverted upper platform 246.

Figure 22:
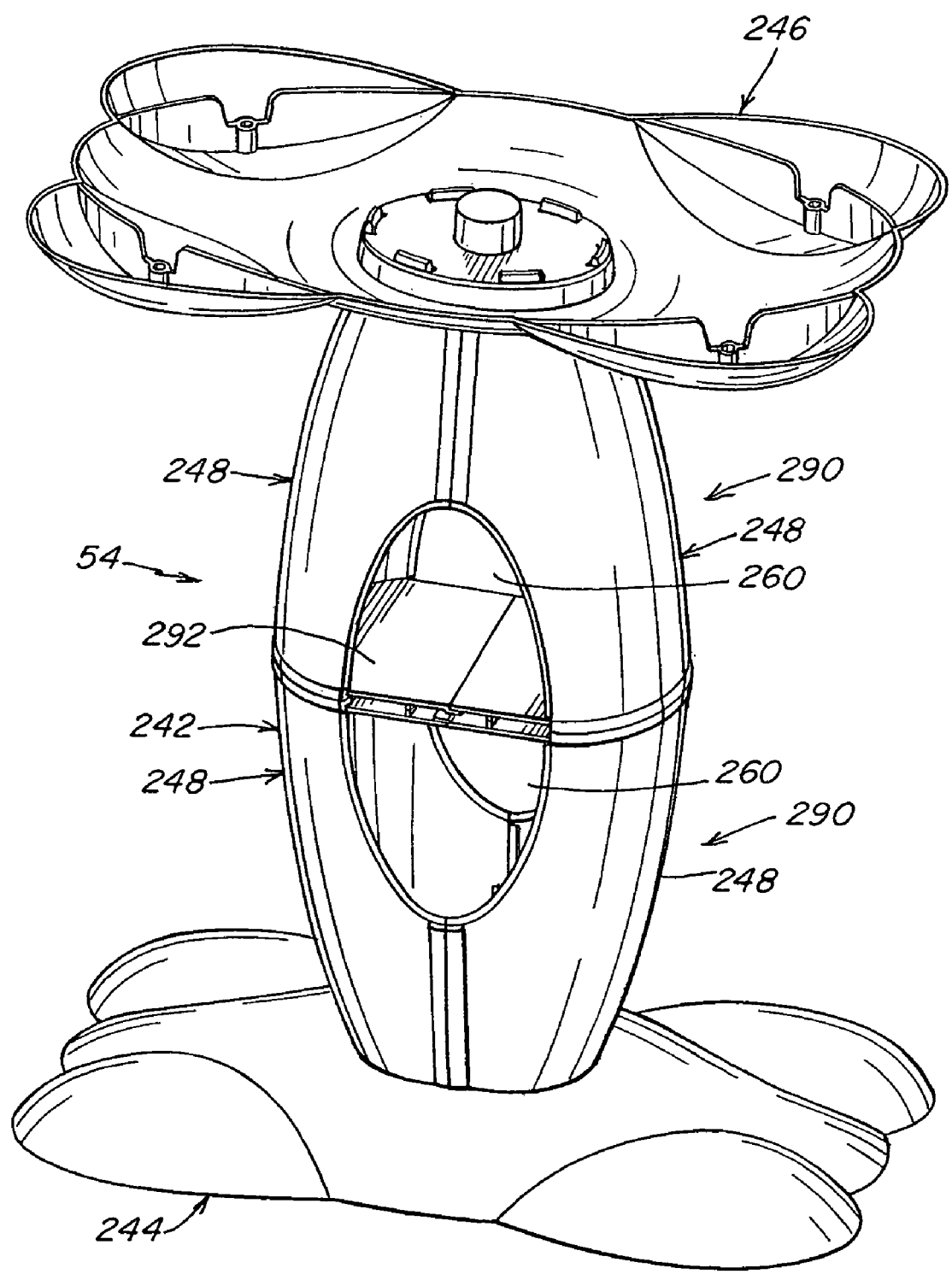

FIG. 20 shows how half the stand 54 is assembled. The complete stand in the illustrated embodiment is composed of two essentially identical sub-assemblies as is clearly shown in FIG. 21 assuming that the base 244 and platform 246 are the same. In that figure, two assemblies 290 each composed of two components 248 and a base 244 (or platform 246) are brought together so that the larger collars 266 in each sub-assembly 290 receive the opposite smaller collars 264. It is evident that because of the staggered relationship of the smaller and larger connecting collars, the smaller and larger collars will be aligned with one another when one sub-assembly is inverted. When the two are brought together as shown in FIG. 22, a unitary structure is created that provides a firm support for the cage. It should be noted that the walls 262 that carry the collars 264 and 266 form a shelf 292 across the middle of the assembled column accessible through the openings 260.

Figure 23:
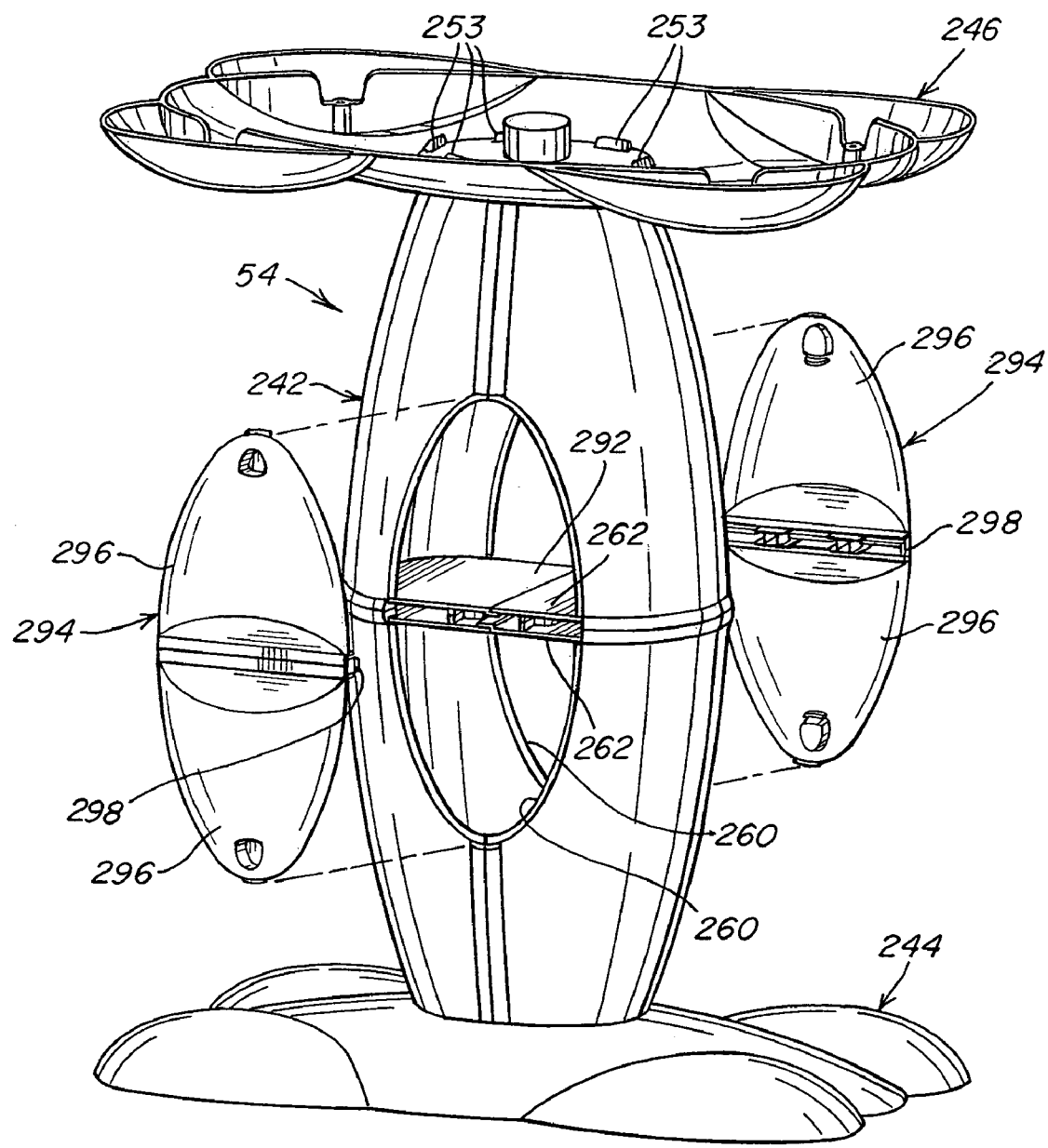
FIGS. 23 and 24 are fragmentary perspective views of the stand showing the manner in which the doors are assembled on the stand.
Figure 24:
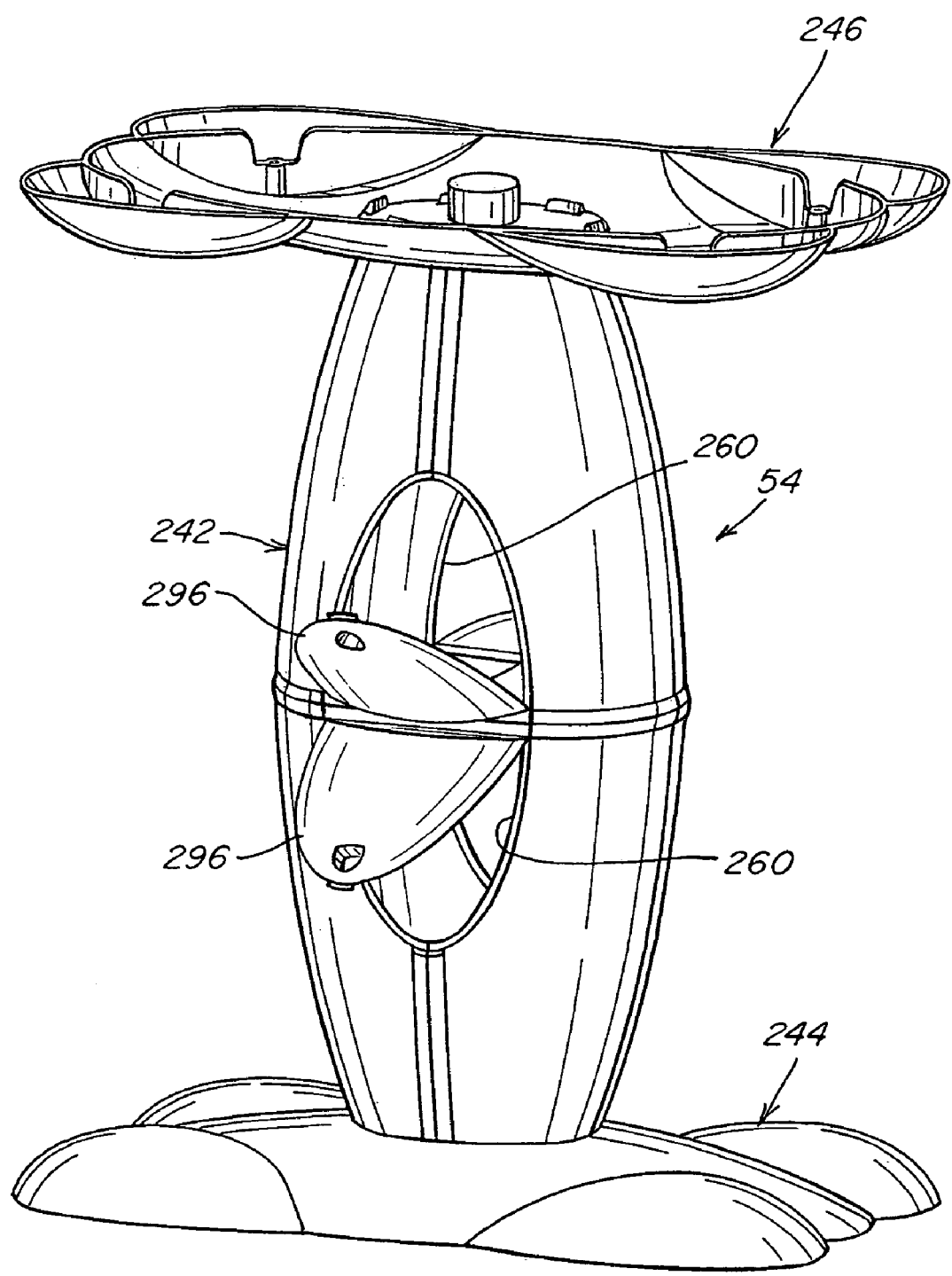

In FIGS. 23 and 24 door sub-assemblies 294 each composed of two doors 296 are shown to snap into place over the openings 260 by means of the catches 298 that engage the edges of the shelf 292 in the space between the walls 262. The doors 296 are hinged together so that each may open and close independent of the other (see the open position of the doors in FIG. 24 and the closed position in FIG. 19). Alternative methods for mountings the door 296 may be employed and different latch arrangements may also be used, such as sliding locks, friction closures, etc. to retain the doors in the closed position. The space within the column 242 may be used to store seed or other bird food as well as any other cage accessory. To increase stability of the stand, sand bags or bags of water may be placed in the column 242 and particularly in the bottom half thereof so as to lower the center of gravity of the assembly.

Figure 25:
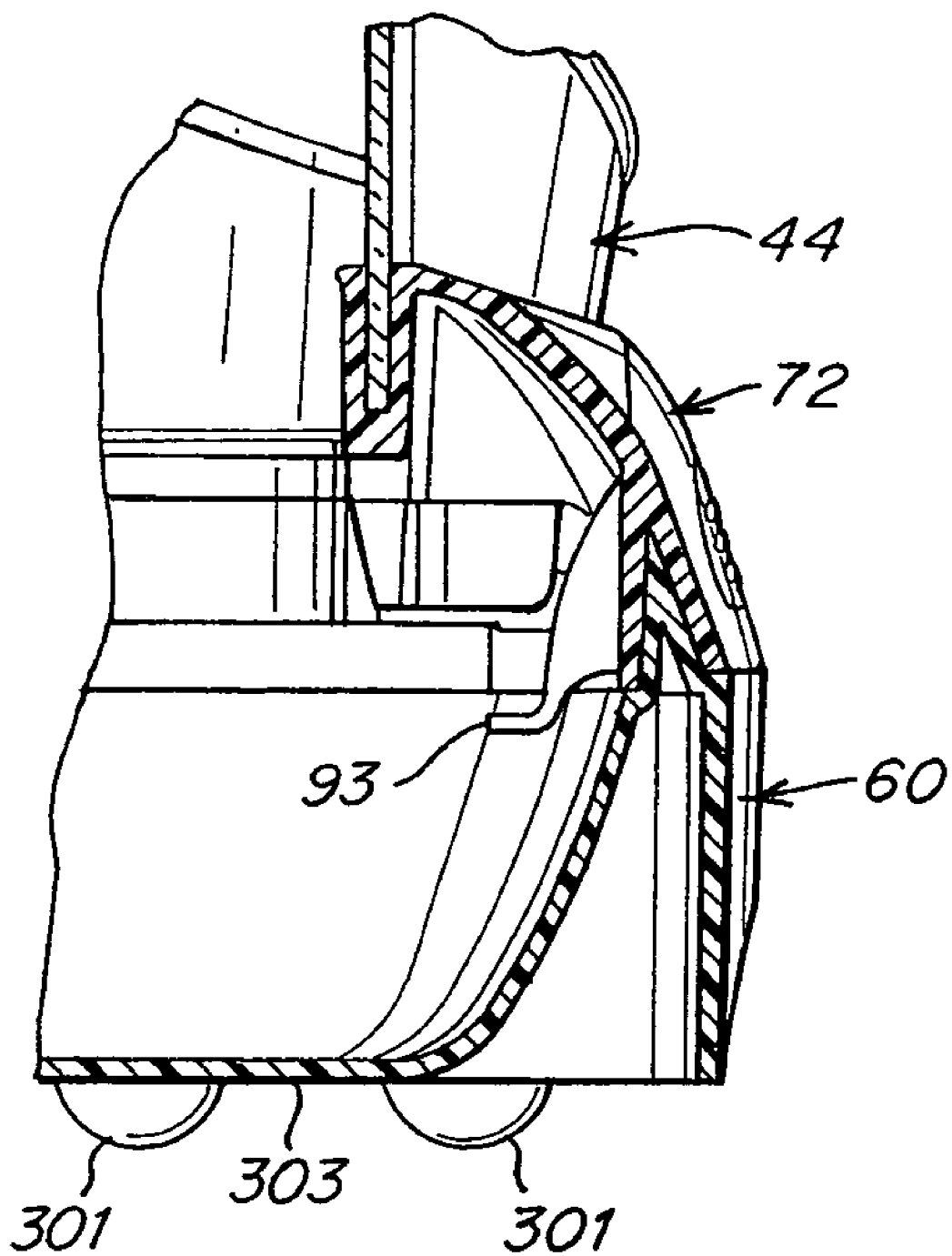
FIG. 25 is a fragmentary cross-sectional view of another embodiment of a base assembly of a cage in accordance with the invention.

The platform 246 is specially shaped to receive the base 60 of the assembled cage. For example, the base 60 of the cage may include a number of feet 300 such as semispherical projections (see FIG. 25) on its bottom surface 302 that are coplanar and are suitable to rest on a flat surface when the cage is used without a stand. The same feet 300 may register with recesses (not shown) in the top surface of the platform 246 so as to provide a stable connection between the cage and stand when the stand is used. The feet may take many different shapes but they should be suitable for resting on a finished furniture surface without marring it and should also be easily registrable with the mating connection in the stand platform so that the cage may easily and conveniently be removed from and be mounted on the stand as desired.

In the foregoing description, substantial details have been presented relating to the manner in which various components of the cage and stand are connected together. It is to be understood that the breadth of the present invention is not confined to those details. For example, while preferred methods of connecting the towers 44 to the base assembly 40 and the cover assembly 42 are described and shown, other expedients may be used to assemble those elements together, such as clamps, brackets, screws etc. The same comments apply to the connections of the various elements of the base assembly 40, stand 54, feeding stations 160, grills and cage expansion components. The breadth of the invention therefore, is not limited to the specific embodiments illustrated and described. Rather, the scope of the invention is to be determined by the appended claims and their equivalents.

What is claimed is:

1. A bird cage comprising
a base having a bottom wall and an upwardly extending side wall,
a guard attached to the base and having a side wall extending upwardly from the top of the base side wall, said guard side wall extending about the circumference of the base and converging in an upwardly direction about the circumference of the base, and
an enclosure attached to the top edge of the guard forming a cage with the guard and base,
the footprint of the enclosure being smaller than footprint of the guard at the guard's point of attachment to the base.

2. The bird cage as defined in claim 1 wherein the side wall of the guard converges upwardly from the base to the enclosure.

3. A bird cage comprising
a base and a guard attached to and extending upwardly from the base, and side wall grills attached to the top of the guard,
the horizontal footprint of the cage measured in a plane intersecting the grills being smaller than the footprint of the guard at its point of attachment to the base.

4. The bird cage of claim 3 wherein the guard is made of a plastic material.

5. The bird cage of claim 4 wherein the guard is transparent.

6. The cage of claim 3 wherein the guard includes side walls that converge with one another in an upwardly direction.

* * * * *